INVENTORS.
GEORGE F. FLOYD,
JACK H. IRVING,
HAROLD R. KAISER,
RUBEN F. METTLER,
BY
Henry Heyman
ATTORNEY.

INVENTORS
GEORGE F. FLOYD,
JACK H. IRVING,
HAROLD R. KAISER,
RUBEN F. METTLER.
BY
Henry Heyman
ATTORNEY.

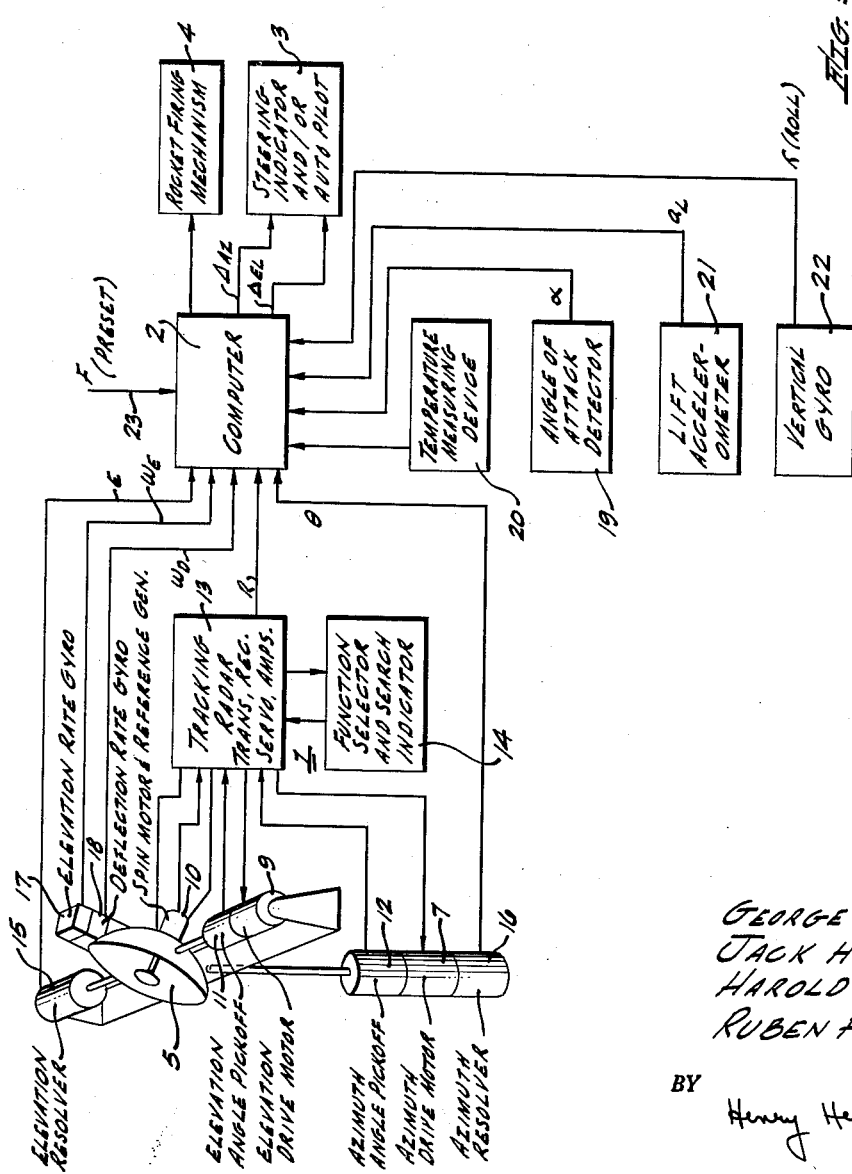

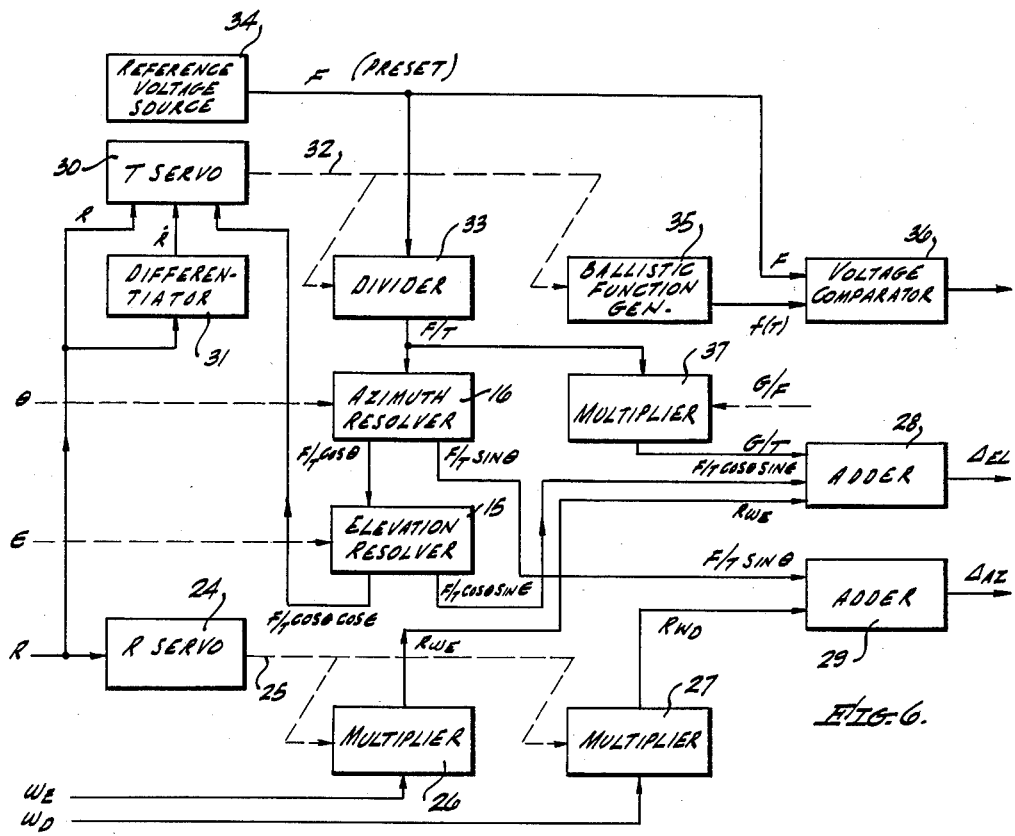
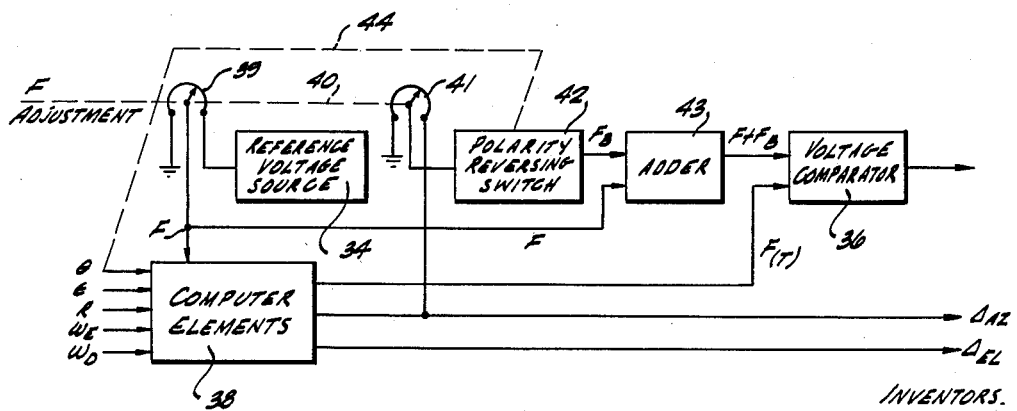

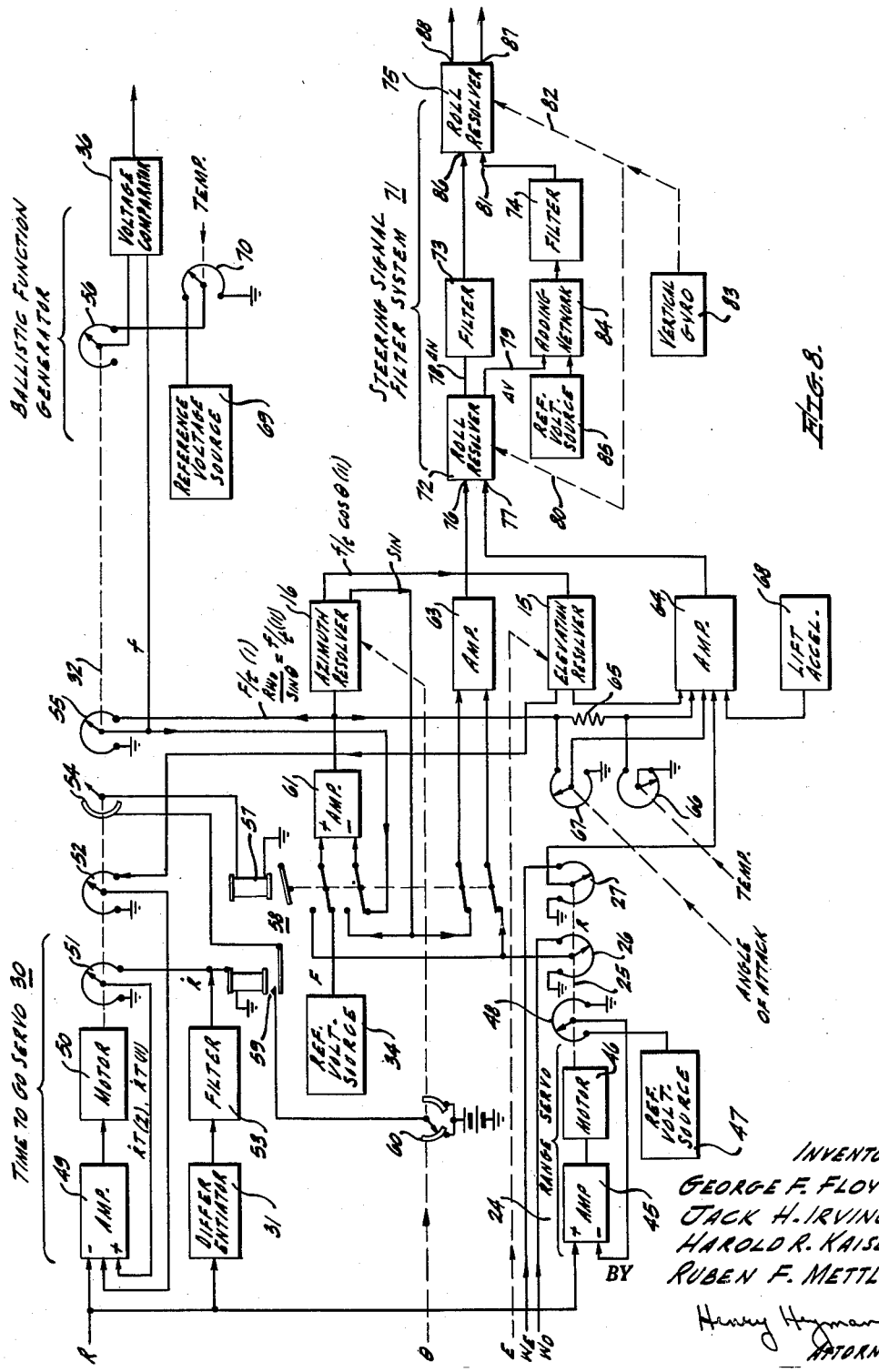

United States Patent Office 2,992,423
Patented July 11, 1961

2,992,423
ROCKET LAUNCH CONTROL SYSTEMS
George F. Floyd, Rolling Hills, Jack Howard Irving, Santa Monica, Harold R. Kaiser, Woodland Hills, and Ruben F. Mettler, Los Angeles, Calif., assignors to Hughes Aircraft Company, Culver City, Calif., a corporation of Delaware
Filed May 3, 1954, Ser. No. 426,956
21 Claims. (Cl. 343—7)

This invention relates to improvements in rocket launching control systems, and more particularly to rocket launching control systems for air-to-air combat, such as attacks by interceptor aircraft with rockets against bombers or other aircraft.

The time required to launch all of the rockets that an interceptor can carry is only a few tenths of a second. This is very much less than the time required to deliver a comparable fire with other weapons, such as machine guns. For an effective attack with guns, an interceptor must maintain a launching position throughout a relatively long period, perhaps several seconds. In general, this makes it necessary for the interceptor to approach the target on a course that lies within a sector to the rear of the target. The projected area presented by the target to the attacker is then substantially at a minimum, decreasing the probability of hits. Also, if the target is equipped with tail armament, as bombers usually are, the attacker is exposed to retaliatory fire to substantially the same extent as the target is exposed to fire from the attacker.

Because a rocket launching attacker can deliver its fire so rapidly, it is only required to maintain a proper launching position for a fraction of a second. Therefore, it is not inherently limited to a tail-zone attack course, but could approach the target from a broadside direction if the rockets were launched substantially at the instant when the proper relationship existed between the positions and velocities of the target and the attacker, in accordance with the ballistic characteristics of the type of rocket to be used. A side approach attack course offers the tactical advantages of minimizing the exposure of the attacker to defensive fire, presenting a maximum of projected target area to the attacker, and allowing the attacker freedom to maneuver at will except during a relatively short run immediately prior to launching. Some of the foregoing considerations apply also in the case of rocket attacks from an aircraft against stationary or slowly moving surface targets, particularly in the presence of strong crosswind.

The principal object of the present invention is to provide methods of and means for exploiting the tactical potentialities of rockets and similar weapons.

A corollary object is to provide improvements in fire control systems to take into account the extremely high rate of fire that is possible with rockets, and utilize this characteristic to maximum advantage.

A related object is to provide an improved type of fire control computer system adapted to accept directional and range signals from a sighting device, such as a tracking radar system, and to produce steering and firing signals respectively for guiding an attacker craft along a course that leads to a correct launching position, and for firing rockets from the attacker when it reaches that position.

Another object of this invention is to provide computers of the aforementioned type capable of producing steering signals for guiding an attacker by the shortest possible route to a correct firing position.

A further object is to provide an improved type of rocket fire control computer that automatically corrects for the effects of target maneuvers, and errors on the part of the pilot in following the steering signals, by continuously recomputing new steering and firing signals based on the current relationship between the positions and velocity vectors of the attacker and the target.

Another object is to provide improved fire control systems capable of directing a rocket attack against a target from any direction, and from above or below the target.

The novel features which are believed to be characteristic of the invention, both as to its organization and method of operation, together with further objects and advantages thereof, will be better understood from the following description considered in connection with the accompanying drawings, in which several embodiments of the invention are illustrated by way of examples. It is to be expressly understood, however, that the drawings are for the purpose of illustration and description only and are not intended as a definition of the limits of the invention.

FIG. 5 is a schematic block diagram of a complete fire control system according to this invention, showing the general relationships and connections between the major elements thereof;

FIG. 6 is a schematic block diagram of a basic fire control computer constituting one of the elements of the system of FIG. 5;

FIG. 7 is a schematic diagram showing a modification of the system of FIG. 6 to provide compensation for target maneuvers and/or attacker steering errors; and FIG. 8 is a schematic block diagram showing a further modification of the system of FIG. 6 that provides error compensation in another manner, and also includes certain refinements to correct the effects of roll of the attacking craft and to discriminate against spurious signals of the type known as tracking noise.

For rockets fired from an attacker craft to strike a target that is moving relative to the attacker, it is necessary that the rocket be fired in such a direction and at such a time as to arrive at some point in the target's path at substantially the same instant as the target does. With rocket launching means that are fixed to the body of the attacker craft, as is generally the case, the attacker must be guided so as to be headed in the proper direction at the instant of firing.

Figure 1:
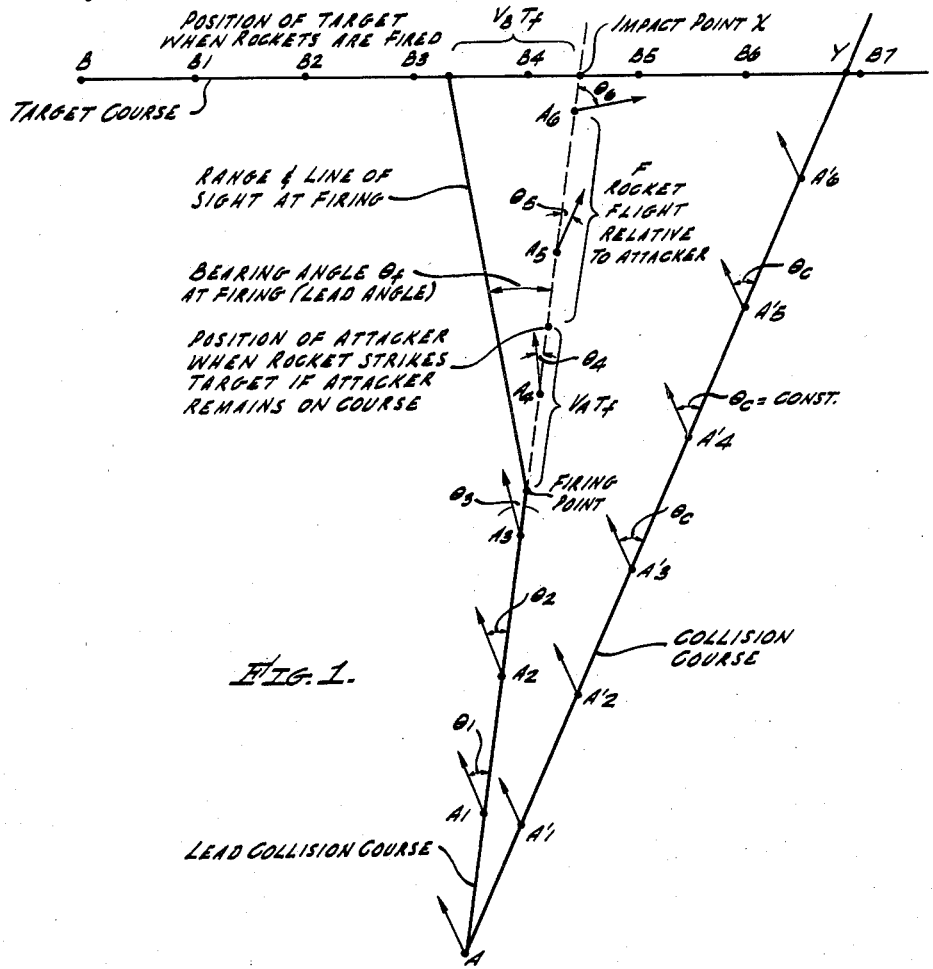
FIG. 1 is a diagram depicting in plan view the geometric relationships involved in a rocket attack on a moving target by an attacker approaching the target from a broadside direction.

According to the practice of the present invention, the attacker craft is directed along a straight line course that intersects the target course like a collision course, but differs from a true collision course by taking into account the range at which the rockets are to be fired. Referring to FIG. 1, assume the target to be at B when the attacker is at A. The target moves along the course B—Y at a velocity $V_B$, arriving at points $B_1$, $B_2$, $B_3$ etc. at the ends of successive equal intervals of time. The arrow extending from the point A indicates the direction of the line of sight from the attacker to the target. Suppose that the attacker were guided along a line A—Y with a velocity $V_A$, arriving at the points $A'_1$, $A'_2$, $A'_3$, etc.

as the target reaches $B_1$, $B_2$, $B_3$, etc. respectively, so that the line of sight remains at a constant bearing angle $\theta_c$ with respect to the attacker's course. Thus, the attacker arrives at the point Y at the same time as the target, and they would collide. The course A—Y is a collision course.

Now suppose that the attacker is carrying rockets, and the rockets are to travel a distance F, relative to the attacker, in their flight from the attacker to the target. The attacker could be considered as carrying a pole of length F extending out in front of it, and the problem would be to guide the attacker so that the outer end of the pole would follow a collision course with respect to the target. The attacker course in this case is called a "lead collision" course, and is indicated by the line A—Y in FIG. 1.

The attacker arrives at the points $A_1$, $A_2$, $A_3$, etc. as the target reaches $B_1$, $B_2$, $B_3$, etc. respectively. The bearing angle remains nearly constant at long ranges; $\theta_1$ and $\theta_2$, at the points $A_1$ and $A_2$, are approximately the same as the initial bearing angle at point A.

As the range decreases, the bearing angle changes with increasing rapidity. The rockets are fired at an instant that is earlier than that at which the bearing angle would reach zero, by an interval $T_f$, which is the time of flight required for the rockets to travel the distance F relative to the attacker. During the period $T_f$, the target moves through the distance $V_A \cdot T_f$. Meanwhile, the rockets travel the distance F relative to the attacker, arriving at the point X at the same time as the target. The angle $\theta_f$ between the direction in which the rockets are fired and the line of sight at the instant of firing is the lead angle.

Figure 2:
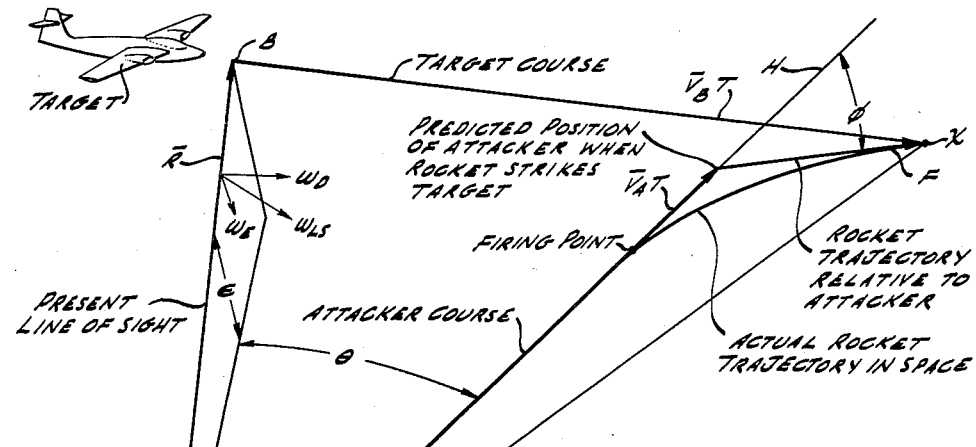
FIG. 2 is a perspective diagram representing substantially the same situation as FIG. 1 but showing the elevation components of the paths of the attacker, target and rockets, and the space orientation of the attacker craft and the line of sight from the attacker to the target.

Referring to FIG. 2, the attacker and the target are assumed to be at positions A and B respectively at an instant designated as "present." The line A—B is the present line of sight, and the present vector range $\overline{R}$ is the distance along the line A—B. The target moves along its course with a vector velocity $\overline{V}_B$, and is due to arrive at a point X at the end of a period T. The attacker has a vector velocity $\overline{V}_A$, and the rocket travel relative to the attacker is the vector $\overline{F}$. The line F is substantially a straight line, deflected generally downward from the attacker course, as will be explained hereinafter.

In order for the target to be hit, the ends of the vectors $\overline{V}_B T$ and $\overline{F}$ must coincide at the point X, as shown. This requires that the attacker craft be guided, in azimuth and in elevation, so as to maintain the relationship:

$$\overline{R} + \overline{V}_B T = \overline{V}_A T + \overline{F}$$

and that the rockets be launched at an instant preceding the end of the period T, by the amount $T_f$.

In normal flight, the longitudinal axis of an aircraft is elevated with respect to the direction of the airstream relative to the craft by an angle $\alpha$, called the angle of attack. This angle varies, depending upon the airspeed and lift. The rocket launching tubes may be placed at some angle $\alpha_{AV}$ below the craft's longitudinal axis (see FIG. 3) where $\alpha_{AV}$ is nominally the average angle of attack. Then when the craft is flying in its normal or average attitude, $\alpha = \alpha_{AV}$ and the launching tubes are aligned with the relative airstream.

Figure 3:
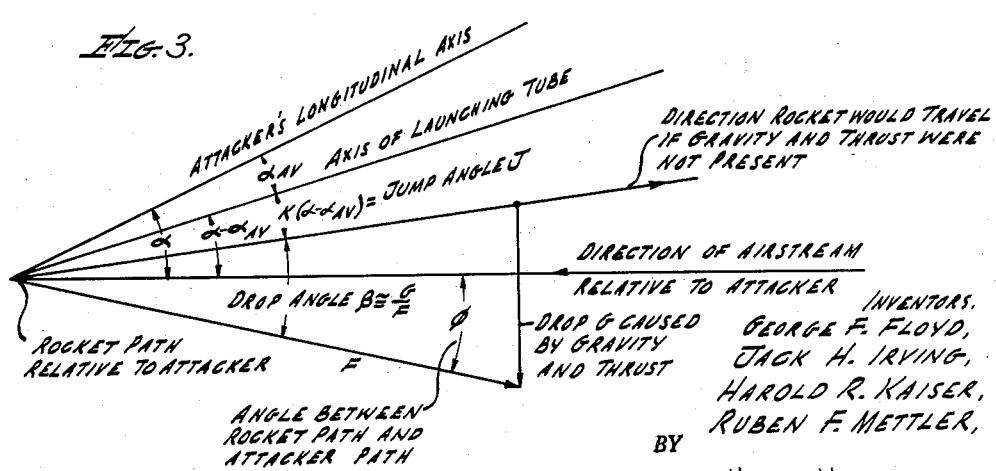
FIG. 3 is a geometrical diagram showing in relative coordinates (moving with the attacker craft) the effects of jump angle and gravity and thrust drop on the trajectory, in a vertical plane, of a rocket fired from the attacker.

When the craft is in a different attitude, as shown in FIG. 3, the launching tubes will be at an angle $\alpha - \alpha_{AV}$ with respect to the airstream, and rockets launched under this condition will travel a short distance in the direction of the launching tube axis, then "weathercock" to align themselves with their own relative airstream. The effect of this is to deflect the rockets from their original launching direction by an angle J, called the jump angle. The jump angle is substantially proportional to the difference between the actual and the average angles of attack:

$$J = K(\alpha - \alpha_{AV})$$

where K is a constant, typically about 0.85.

In addition to the aerodynamic effects that produce the jump angle, the rocket is subject to the thrust caused by its own propulsion means, and to the acceleration of gravity. The combined effect of gravity and thrust makes the trajectory of the rocket, relative to the aircraft, substantially a straight line that is deflected downward at a fixed angle $\beta$ with respect to the direction in which it would leave the vicinity of the craft if gravity and thrust were not present. This holds true up to the "burnout" range, i.e. until the propulsion charge is consumed. The firing ranges contemplated in the present system are always less than the burnout range. The total drop due to gravity and thrust in a typical case is about 0.036 F, i.e. $\beta$ is about 0.036 radians.

Returning to FIG. 2, the arrow $i$ represents the launching tube axis. The arrow $j$ is perpendicular to $i$ and perpendicular to the plane of symmetry of the attacker craft, and is called the elevation axis. The arrow $k$ is perpendicular to both $i$ and $j$, and is the deflection axis of the attacker. The azimuth angle between the line of sight and the $i$ axis is $\theta$, and is measured in the $i$—$j$ plane. The elevation angle of the line of sight with respect to the $i$—$j$ plane is E. The angular velocity of the line of sight about the deflection axis is $\omega_D$, and the angular velocity about the elevation axis is $\omega_E$.

The vector velocity $\overline{V}_B$ of the target is not measurable directly on the attacker. However, the quantities $\theta$, E, $\omega_D$, $\omega_E$ and the scalar range R can be measured by suitable means such as radar apparatus on the attacker. A computer to solve the fire control problems represented in FIG. 2 must use physically measurable quantities such as these and operate to produce signals that represent how the attacker should be turned about its elevation and deflection axes to bring it on to a lead collision course, and to fire the rockets at the correct time.

Figure 4:
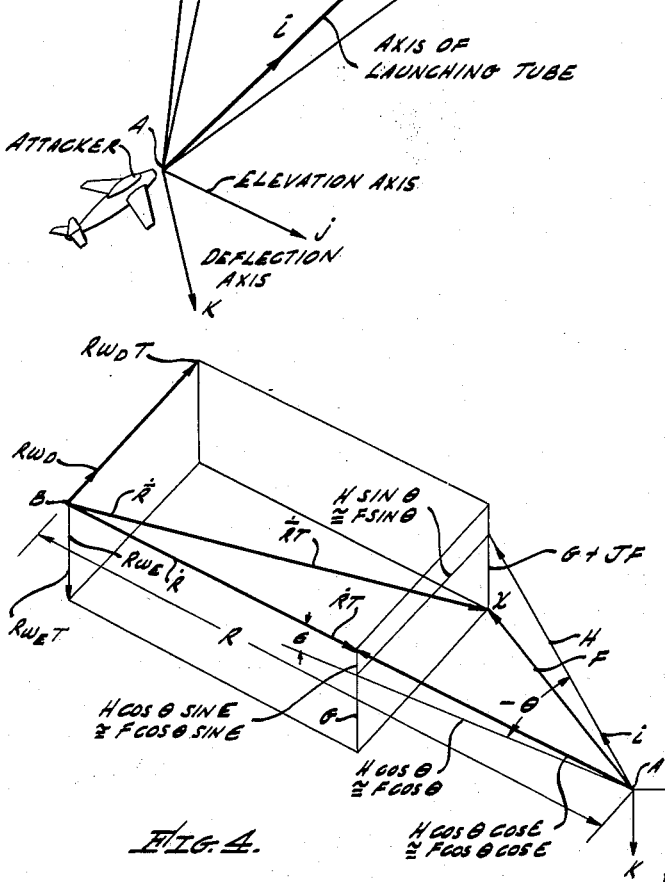
FIG. 4 is a perspective diagram representing substantially the same relationships as are shown in FIG. 2, but in relative coordinates, moving with the attacker craft.

Refer now to FIG. 4, which represents substantially the same situation as that shown in FIG. 2, but in coordinates moving with the attacker craft. That is, the attacker is regarded as fixed at the point A, oriented as indicated by the arrows $i$, $j$ and $k$, and the target and rocket motions are considered relative to the attacker; the target motion shown is the vector difference between the actual motions in space of the target and the attacker. The present position of the target is at B. The scalar range is R, the distance between A and B. The angles $\theta$ and E are measured respectively in, and at a right angle to, the $i$—$j$ plane, as in FIG. 2. By sign convention, the angle $\theta$ is negative in the situation illustrated, where the line of sight is counterclockwise from the reference direction $i$.

The target velocity relative to the attacker can be resolved into three orthogonal components: the elevation and deflection components, both at right angles to the line of sight, and a range component lying along the line of sight. The elevation component is $R\omega_E$, the deflection component is $R\omega_D$, and the range component is the rate of change of the scalar range $$\frac{d R}{d_t} = \dot{R}$$

In FIG. 2, the target is approaching the attacker, so $\dot{R}$ is negative. The sum of these three components, i.e. the relative vector target velocity, is denoted as the vector range rate, $\dot{\overline{R}}$. The vectors $R\omega_E T$, $R\omega_D T$, and $\dot{R}T$ show the respective displacements of the target in elevation, deflection and range at the end of a period T. Their resultant is $\dot{\overline{R}}T$, and it is seen that at the end of the period T the target will be at the point X.

The rocket path vector F can be resolved similarly into elevation, deflection and range components. Since the sum of the jump JF and the gravity and thrust drop G are relatively small compared to the length of the rocket path, the component H along the $i$ axis may be taken as equal to F without introducing significant error. Then the elevation component of F is $F \cos \theta \sin E$, the deflection component is $F \sin \theta$, and the range component (along the line of sight) is $F \cos \theta \cos E$.

FIG. 4 shows that for the rocket to strike the target at the point X, the following relationships must be satisfied, bearing in mind that $\theta$, R, and $\omega_E$ are negative as shown in FIG. 4:

(1) $\quad -R\omega_E T = F \cos \theta \sin E + G + JF$ (2) $\quad R\omega_D T = -F \sin \theta$ (3) $\quad R + \dot{R}T = F \cos \theta \cos E$ All of the quantities in the above equations are known or determinable by physical measurements made on board the attacker craft, except T.

Assume now that the tip of the rocket trajectory vector F does not meet that of the target vector $\vec{R}T$, but misses it by some amount $\overline{M}$, which is also a vector quantity. The miss vector $\overline{M}$ can be resolved into respective elevation, deflection and range components $M_E$, $M_D$ and $M_R$. Then Equations 1, 2 and 3 are no longer satisfied, but can be replaced by the following:

(4) $\quad M_E = -R\omega_E T - F \cos \theta \sin E + G + JF$ (5) $\quad M_D = R\omega_D T + F \sin \theta$ (6) $\quad M_R = R + \dot{R}T - F \cos \theta \cos E$ If the miss $\overline{M}$ were zero, Equations 4, 5 and 6 would become the same as (1), (2) and (3); and T, the time-to-go before impact, could be computed readily by solving for it in any one of the three equations. However, this cannot be done directly because the miss cannot be known, and therefore cannot be ascertained to be zero, without first knowing what value of T to use in Equations 4, 5 and 6. This problem is solved by arbitrarily assuming the range miss $M_R$ to be zero, and solving Equation 6 or 3 for T. The resulting answer will not be the true value of T, unless the range miss actually happens to be zero, but will be a preliminary computational value:

$$T_c = \frac{F \cos \theta \cos E - R}{\dot{R}}$$

Then this value may be substituted for T in Equations 4 and 5 to compute preliminary values for the elevation and deflection miss components $M_E$ and $M_D$. Now suppose that the attacker is turned through the required angles in elevation and deflection to reduce these computed miss components to zero. As they approach zero, the computed time-to-go $T_c$ approaches the true time-to-go T, and the approximations become more accurate, i.e. the computed miss components become more nearly equal to the real miss components, and reach zero together as the attacker attains the correct heading.

The miss components $M_E$ and $M_D$ are distances, measured transversely to the line of sight. The angles that the attacker should turn through in elevation and azimuth respectively to reduce the distances $M_E$ and $M_D$ to zero are:

(7) $\quad \delta_{EL} = \frac{\cos E}{V_A T + F} \cdot M_E$ and (8) $\quad \delta_{AZ} = \frac{\cos \theta}{V_A T + F} \cdot M_D$ where $V_A$ is the attacker airspeed. These relationships can be deduced from FIG. 2, where it is seen that the distance from A to the end of the rocket flight vector is $V_A T + F$ (to a close approximation) and any miss components perpendicular to the present line of sight would themselves have components perpendicular to the $i$ axis and proportional to the cosines of E and $\theta$ respectively.

The factors $$\frac{\cos E}{V_A T + F} \text{ and } \frac{\cos \theta}{V_A T + F}$$

in Equations 7 and 8 may be regarded as multipliers that convert the computed miss distances $M_E$ and $M_D$ into correction angles to turn through. They need not be known with precision, since $M_E$ and $M_D$ will become zero in any event when the attacker is on course. As a practical matter, these multipliers can be replaced by $$\frac{1}{V_A T}$$

With this substitution, the elevation steering equation becomes (9) $\quad \Delta_{EL} = \frac{M_E}{V_A T}$

(10) $\quad \Delta_{EL} = P[R\omega_E + F/T (\cos \theta \sin E + G/F + J)]$ and the azimuth steering equation becomes:

(11) $\quad \Delta_{AZ} = Q[R\omega_D + F/T \sin \theta]$ where P and Q are constants that depend on the attacker airspeed and conversion factors; for example, if the steering signals are to be in the form of electrical voltages, these constants include a factor having the dimension of volts per degree of angle to turn through. The substitution of $$\frac{1}{V_A T}$$

for the true multiplying factors of Equations 7 and 8 makes the overall ratio of Indicated angle to turn through
Required angle to turn through vary as a function of the range, increasing as the target is approached. This simply means that the steering signals $\Delta_{EL}$ and $\Delta_{AZ}$ for a given angular error will be larger near the end of the attack. The total variation of this ratio throughout a typical attack will be about 2 to 1.

Referring to FIG. 5, a system for carrying out rocket attacks in accordance with the foregoing theory comprises tracking radar apparatus, generally designated by the reference character 1, a computer 2 connected to take sighting and range information signals from the radar, and utilization circuits 3 and 4 for steering an attacker craft which carries the system, and for firing rockets in response to a firing signal provided by the computer.

The radar apparatus 1 includes a directive antenna 5 that is mounted for rotation in azimuth about a generally vertical axis by means of an azimuth drive servo motor 7, and for independent rotation in elevation about a horizontal axis by an elevation drive servo motor 9. The antenna assembly also includes a spin motor and reference generator 10 for rotating a part of the feed system to cause the antenna beam to scan continuously through a narrow conical sector, and to provide a reference signal corresponding to the instantaneous position of the beam with respect to the principal axis of the antenna.

Elevation and azimuth angle pickoff means 11 and 12 such as selsyn devices are coupled to the respective antenna drives to provide repeat back signals for the servo networks that control the motors 9 and 7. The block 13 in FIG. 5 represents the radar transmitter and receiver circuits, the elevation and azimuth servo amplifiers, and automatic range tracking circuit, all of which may be designed and interconnected in accordance with known practice. The radar apparatus 1 also includes function selector and search indicator means 14 for controlling the equipment to scan throughout a large sector to locate a target, and to enable manual control of the antenna drives to center the beam on a selected target, prior to the initiation of automatic tracking operation.

Elevation and azimuth resolvers 15 and 16 are coupled to the respective antenna drives, and form part of the computer 2, as will be described. An elevation rate gyro 17 and a deflection rate gyro 18 are mounted on the antenna assembly and arranged in known manner to provide output signals representing the rates of turn, i.e. angular velocities of the antenna about its elevation and deflection axes. Note that the deflection axis is tilted with respect to the azimuth axis, by the elevation angle.

The computer 2 is connected to the radar 1 to receive elevation and deflection rate signals from the rate gyros 17 and 18, elevation and azimuth information by way of the resolvers 15 and 16, and a target range signal from the range tracking circuit in the unit 13. An angle of attack detector 19 is also connected to the computer 2 to provide it with a signal representing the alignment of the attacker craft with respect to its airstream. In addition, a temperature measuring device 20, a lift accelerometer 21, and a vertical gyro 22 may be arranged to provide the computer with signals that correspond respectively to the temperature, lift acceleration, and bank angle of the attacker craft. As indicated schematically by the arrow 23, the computer is also provided with a preset value of F, the relative rocket firing range. This may be effected by adjustment of a voltage within the computer, as will be described.

The computer 2 is designed to solve Equations 3, 10 and 11, as described above, to determine the time-to-go T, the angle to turn through in elevation $\Delta_{EL}$ and the angle to turn through in azimuth $\Delta_{AZ}$, producing signal voltages that correspond respectively in magnitude to T, $\Delta_{EL}$ and $\Delta_{AZ}$. The $\Delta_{EL}$ and $\Delta_{AZ}$ signals are applied to the steering indicator and/or autopilot 3 to guide the attacker to, and then to maintain it on, the required lead collision course. The T signal is utilized to provide a signal having a magnitude that represents what the length of the relative rocket path would be if the time of flight were equal to the present computed value of T. This signal is denoted $f(T)$, and is continuously compared in the computer with a signal representing the preset value of F. When $f(T)$ becomes equal to F, the computer produces a firing signal which goes to the rocket firing mechanism 4.

FIG. 6 shows the basic elements of the computer 2, and their interconnections. A servomechanism 24, hereinafter referred to as the "range servo" or "R servo," is designed to position a shaft 25 in accordance with the magnitude of the range signal provided by the radar system. The shaft 25 is coupled to a multiplying device 26 which has the property of producing an output signal whose amplitude is proportional to the numerical product of the range input, as provided by the shaft 25, and the elevation rate signal $\omega_E$ provided by the rate gyro 17 on the antenna assembly. The multiplier 26 may be simply a potentiometer having a linear resistance-rotation characteristic, with its shaft connected to the shaft 25.

The shaft 25 is also coupled to a second multiplying device 27 which may be the same as the multiplier 26 except that it is connected to receive the deflection rate signal $\omega_D$ from the rate gyro 18. The output from the multiplier 26 is applied to an adding network 28, where it is combined with other signals to provide the elevation steering signal. The output from the multiplier 27 goes to another adding network 29, forming one of the components of the azimuth steering signal.

The range signal from the radar system is also applied to a servomechanism 30, which is referred to hereinafter as the "time-to-go servo," or "T servo," and to a differentiating circuit 31. The output of the differentiator 31 is a signal whose magnitude is substantially proportional to $\dot{R}$, the rate of change of the range R. This range rate signal is applied as a second input to the T servo 30.

The output shaft 32 of the T servo is coupled to a divider 33. A reference voltage source 34 provides a constant output voltage having a magnitude that represents the preset value of F, the length of the desired rocket trajectory relative to the attacker craft. The F signal is applied to the divider 33, which has the property of producing an output proportional to the quotient of the electrical input (F) divided by a number that represents the position of the shaft 32. The divider 33 may comprise simply a potentiometer with its shaft coupled to the shaft 32, or may be a more elaborate arrangement including a linear potentiometer and a negative feedback amplifier, as will be described with reference to FIG. 8.

The output of the divider 33 is applied to the azimuth resolver 16, which is designed in known manner to provide two output whose magnitudes are equal to the sine and cosine respectively of the azimuth angle $\theta$, multiplied by the input signal supplied by the divider 33. The cosine output of the azimuth resolver goes to the elevation resolver 15, which is similar to the azimuth resolver except that its outputs include the factors of the sine and cosine of the elevation angle E. The sine output of the azimuth resolver 16 goes to the adding network 29, where it is algebraically combined with the output of the multiplier 27 to form the azimuth steering signal.

The cosine output of the elevation resolver 15 is applied to the T servo 30 as a third input signal. The sine output of the resolver 15 is applied to the adder 28 to form part of the elevation steering signal. A third component of the elevation steering signal is provided by a multiplier 37 which is connected between the divider 33 and the adder 28. The multiplier 37 is adjusted to introduce a factor $G/F$, where G is the gravity and thrust drop, as explained above in connection with FIG. 3.

A ballistic function generator 35 is coupled to the shaft 32 of the T servo, and is designed to produce an output signal having a magnitude that is a function of the position of the shaft 32 representing the distance $f(T)$ that a rocket of the type with which the system is to be used would travel in a period T as represented by the shaft position. The function generator 35 may comprise a reference voltage source and a resistor network including a potentiometer coupled to the shaft 32, designed to approximate closely the ballistic function of the particular type of rocket.

The function generator 35 is connected to a voltage comparator circuit 36. The F reference voltage source 34 is also connected to the comparator circuit 36. The comparator 36 is designed to produce an output signal only when the two input signals, representing F and $f(T)$, are equal. This output signal is the firing signal which goes to the rocket firing mechanism.

In the operation of the system of FIG. 6, the voltage F from the source 34 is divided in the divider 33 by a number that corresponds to the position of the time shaft 32. Denoting this number as $T_c$, the output of the divider is a voltage of magnitude $F/T_c$. The voltage $F/T_c$ is multiplied in the resolvers 16 and 15 by the cosines of the azimuth and elevation angles respectively, and the resultant voltage $(F/T_c) \cos \theta \cos E$ goes to the T servo 30. In the servo 30, this signal is combined with the range signal R and the range rate signal $\dot{R}$ to control the energization of a motor that positions the T shaft 32. The shaft 32 is driven to a position such as to make $R + \dot{R}T_c - F \cos \theta \cos E = 0$, and the shaft position then corresponds to $T_c$.

The range servo 24 positions the shaft 25 according to the target range R, adjusting the multiplier 27 to provide an output of magnitude $R\omega_D$. This is combined in the adder 29 with the sine output of the azimuth resolver 16 $(F/T_c) \sin \theta$, to produce the azimuth steering signal $\Delta_{AZ}$ in accordance with Equation 11. The range servo also adjusts the multiplier 26 to provide an output of magnitude $R\omega_E$, which is combined in the adder 28 with the sine output of the elevation resolver 15 $(F/T_c) \cos \theta \sin E$, and with the output of the multiplier 37, $G/T_c$, to produce the elevation steering signal $\Delta_{EL}$ in accordance with Equation 10.

Now suppose that the attacker craft is turned in azimuth and elevation respectively, so as to make the signals $\Delta_{AZ}$ and $\Delta_{EL}$ approach zero. As this is done, the vector miss approaches zero and the computed time-to-go $T_c$, which is based on the assumption of zero range miss, approaches T, the actual time-to-go. This increases the accuracy of the components of the $\Delta_{AZ}$ and $\Delta_{EL}$ signals which involve T, so that when $\Delta_{AZ}$ and $\Delta_{EL}$ both become zero, the attacker is on the required course, and $T_c=T$. Thereafter, if the target and the attacker continue on the same respective courses, the T servo 30 will continuously rotate its shaft 32 as the predicted time-to-go before impact decreases. This makes the output signal voltage $f(T)$ from the ballistic function generator decrease correspondingly until $f(T)$ becomes equal to F, the preset relative firing range. When this occurs, the voltage comparator 36 produces an output signal for firing the rockets.

The computer of FIG. 6 operates continuously throughout the attack to solve for the time-to-go and to produce the relative firing range signal $f(T)$ and the steering signals, as determined by the current values of the various inputs to the computers. If the relationship between the target and attacker courses should change, for example as a result of evasive maneuvering, the computer will operate in the same manner as described above but will calculate a new lead collision course and produce new steering signals and a new firing range signal on the basis of the changed conditions. If the attacker gets off the computed course for any reason, the computer will guide the attacker along a suitable course from its present position, rather than requiring it to regain a suitable position on the original course. Thus the attacker pilot is given considerable freedom to maneuver, up until shortly before the rockets are fired.

Although the computer of FIG. 6 automatically corrects for pilot errors and target maneuvers by recomputing, it nevertheless requires that the attacker be on the computed course at the instant of firing. This requirement can be relaxed to some extent by taking advantage of the fact that a moderate amount of error in the heading of the attacker can be corrected by appropriately delaying or advancing the time at which the rockets are fired.

Referring again to FIG. 1, when the attacker is on the proper course A—X, the rockets are fired at a time such that they will reach the point X at the same time as the target. If the attacker were off course to the right at this time, the rockets would miss, crossing some point on the target's course before the target got there. But if the firing instant were delayed by the proper amount, the rockets would hit the target. Similarly, if the attacker were off course to the left, the error could be compensated by advancing the firing time. This type of correction involves a change in the time of flight $T_f$ and a corresponding departure of the length of the rocket flight path from the preset value F.

Referring to FIG. 7, the block 38 represents all of the elements of the computer of FIG. 6 except the voltage comparator 36 and the F reference voltage source 34. In this case, the presetting adjustment means for the F signal is potentiometer 39, shown separately from the reference voltage source 34 for convenience of explanation. The shaft 40 of the F adjustment potentiometer is coupled to that of a second potentiometer 41. The potentiometer 41 is connected to the adder 29 in the block 38 to receive the azimuth steering signal.

The movable tap of the potentiometer 41 is connected through a polarity reversing switch 42 to an adding network 43. The tap of the potentiometer 39 is also connected to the adding network 43 to apply the F signal thereto as a second input. The output of the adder 43 goes to the voltage comparator 36 in the same manner as the F signal does in the system of FIG. 6. The reversing switch 42 is coupled to the antenna assembly or to the azimuth resolver as indicated schematically by the dash line 44 in such a manner as to reverse the polarity of the signal derived from the tap of the potentiometer 41 when the bearing angle $\theta$ is negative.

The operation of the system of FIG. 7 is identical with that of FIG. 6 except when the attacker craft is off course in azimuth. Under this condition, the $\Delta_{AZ}$ signal has a value other than zero, and the potentiometer 41 produces an output that is proportional to the product of F and $\Delta_{AZ}$. This signal is denoted as $F_B$ and is applied in the appropriate polarity to the adder 43, where it is added algebraically to the preset range signal F. The adder output $F+F_B$ is compared with the ballistic function signal $f(T)$ in comparator 36 to provide a rocket firing signal when $f(T)=F+F_B$.

The effect of adding the $F_B$ signal to the preset firing range signal F in the above-described manner is to delay the instant of firing when the attacker is off course in the direction that the target is moving across the line of flight of the attacker (to the right in FIG. 1) and to advance the firing time when the attacker is off course in the direction opposite to the target motion. This change in firing time is caused by the change of the relative firing range from F to $F+F_B$, where $$F_B = K F \Delta_{AZ}$$

and K is a constant that depends upon the design of the adding network 43. By making this constant of a suitable value, the change in firing time will closely approximate that required to compensate for the effect of a steering error as represented by the value of $\Delta_{AZ}$.

A somewhat different way to provide automatic firing time correction for azimuth steering errors is to introduce a second phase or mode of computer operation after the attacker has been placed initially on an approximately correct lead collision course, in which a relative rocket path length $f$ is computed continuously on the basis that the attacker craft will continue on its present azimuth heading until the rockets are fired. In other words, the azimuth miss Equation 5 is arbitrarily set to zero and solved for a relative rocket path length $f$ (instead of the preset value F) that would actually make the azimuth miss equal to zero:

(12) $\qquad M_D = 0 = R\omega_D T + f \sin \theta$

It is seen that

(13) $\qquad f = \dfrac{R\omega_D T}{\sin \theta}$

This computed value of $f$ is used in place of F in solving for the time-to-go, which is then denoted $t$. The new computed time $t$ and the computed $f$ are used instead of T and F, respectively, for solving Equation 10 for the elevation steering signal, which then becomes:

(14) $\Delta_{EL, II} = P[R\omega_E + (f/t)(\cos \theta \cos E + G/f + J)]$

The quantities f and t are used instead of F and T in the firing signal equation, the rockets being fired when $$f(t) = f$$

where $f(t)$ is the ballistic function of $t$.

FIG. 8 shows a modification of the system of FIG. 6 to provide a second mode of operation wherein firing time correction is substituted for azimuth steering in the foregoing manner. Some of the elements of the system of FIG. 8, such as the range servo 24 and the time servo 30, are the same as the corresponding elements of FIG. 6, but are shown in more detail in FIG. 8.

The range servo 24 includes an amplifier 45 with its output circuit connected to a motor 46 which is coupled to the range shaft 25. A reference voltage source 47 is connected across a potentiometer 48. The movable tap of the potentiometer 48 is arranged to be driven by the shaft 25, and is connected back to the input circuit of the amplifier 45. The input circuit of the amplifier 45 includes a resistor network arranged in known manner to add the voltage from the potentiometer 48 in opposition to the range signal voltage from the radar system. This relationship is indicated schematically by the plus sign adjacent the range signal input point and the minus sign adjacent the feedback signal input point.

The motor 46 is energized by the amplifier 45 in accordance with the magnitude and sense of any difference between the range signal and the feedback signal, and drives the shaft 25 to adjust the potentiometer 48 so as to reduce the difference substantially to zero, whereupon the motor is de-energized. Thus the shaft 25 is substantially continuously positioned to correspond with the magnitude R of the range signal. The multipliers 26 and 27 consist of potentiometers coupled to the range shaft 25.

The time-to-go servo 30 includes an amplifier 49 connected to energize a motor 50 which is coupled to the time shaft 32. The shaft 32 is coupled to multiplier potentiometers 51 and 52, which have their movable taps connected to the input circuit of the amplifier 49. This input circuit includes an adding network, similar to that of the amplifier 45, but connected to combine the range voltage signal and the feedback signal from the potentiometer 51 in aiding relationship to each other and in opposition to the feedback signal from the potentiometer 52, as indicated by the signs adjacent the respective input points.

As in the system of FIG. 6, the differentiator 31 responds to changes in the range signal to produce a range rate signal. The range rate signal is applied to the multiplier 51. A low pass filter 53 is included in the connection between the differentiator 31 and the multiplier 51 to minimize rapid random fluctuations in the range rate signal and improve the stability of the time servo. Such filtering introduces a time delay in the range rate signal, but this does not seriously affect the accuracy of the system because the actual range rate is a relatively slow and narrow variable quantity. The multiplier 52 is connected to the cosine output of the elevation multiplier 15.

The exact quantitative operation of the time servo depends on the particular signals applied to it, according to which of the two modes of computer operation is in use, as will be discussed later. In either case, the amplifier 49 produces an output that corresponds in magnitude and sense to the algebraic sum of its three inputs, and energizes the motor 50 to position the time shaft 32 so as to reduce this sum to zero.

The time shaft 32 is coupled to a switch 54 so as to close the switch only when the position of the shaft corresponds to a time-to-go of, for example, six seconds or less. The shaft 32 also drives a potentiometer 55 which forms part of a divider device corresponding to the divider 33 of FIG. 6, and a potentiometer 56 constituting part of the ballistic function generator 35.

The switch 54 is connected in the circuit of the actuating electromagnet 57 of a relay 58. Also in this circuit, in series with the switch 54, are the contacts of a relay 59, and a switch 60. The switch 60 is coupled to the azimuth drive system of the radar in such manner as to open the circuit whenever the bearing angle $\theta$ is less than, say, 23 degrees. The actuating magnet of the relay 59 is connected to the output of the range rate filter 53, and is designed to drop out and open the circuit when the range rate is less than some predetermined value, such as 185 yards per second.

The relay 58 is provided with a plurality of ganged contact assemblies, connected as shown to the input circuits of amplifiers 61 and 63. When the magnet 57 is de-energized, the relay contacts are in their lower positions as illustrated, applying the F signal from the reference source 34 to one input terminal of the amplifier 61, and applying the voltage at the tap of the potentiometer 55 to another input terminal of the amplifier 61 in opposition to the F signal, as indicated by the signs adjacent the respective terminals. The sine output of the azimuth resolver 16 goes to one input terminal of the amplifier 63, and the tap of the multiplier potentiometer 26 is connected to another input terminal of the amplifier 63. The input circuit of the amplifier 63 includes a signal adding network which is the equivalent of the adder 29 in the system of FIG. 6.

When the magnet 57 of the relay 58 is energized, the movable contacts are in their upper positions. The first input terminal of the amplifier 61 is then connected to the multiplier potentiometer 26, and the connection of the negative feedback input terminal is transferred to the sine output terminal of the azimuth resolver 16. The input terminals of the amplifier 63 are disconnected and receive no signals.

The cosine output terminal of the azimuth resolver 16 is connected to the elevation resolver 15 as in the system of FIG. 6. The sine output of the elevation resolver goes to the input circuit of an amplifier 64. This input circuit includes an adding network that corresponds to the adder 28 in the system of FIG. 6, but is somewhat more elaborate, being designed to combine a total of five input signals instead of three.

Two of the input signals to the amplifier 64 are derived from the output of the amplifier 61, by way of a network comprising a resistor 65, an adjustable resistor 66, and a potentiometer 67. The resistors 65 and 66 correspond in electrical connection and in function to the multiplier 37 of FIG. 6; in addition, the variable resistor 66 is coupled to or made part of a temperature sensing device to introduce a correction in the gravity and thrust drop G (see FIG. 3), which varies with the temperature of the rocket propellant.

The potentiometer 67 is coupled to or made part of an angle of attack detector device, and it provides a signal representing the jump angle J, which depends upon the angle of attack as has been described with reference to FIG. 3.

A fourth input to the amplifier 64 is provided by the multiplier 27; this is analogous to the connection of the multiplier 27 to the adder 29 in FIG. 6. A lift accelerometer 68, responsive to the acceleration of the attacker along its vertical axis, is connected to provide a fifth input to the amplifier 64. The accelerometer 68 is designed to produce a signal representing $a_L/V$, where $a_L$ is the lift acceleration and V is a constant that corresponds to the nominal air speed of the attacker craft.

The ballistic function generator 35 includes the potentiometer 56 which is driven by the time shaft 32, and a reference voltage source 69. The ballistic function depends somewhat on the temperature, and a potentiometer 70 is included in the connection between the source 69 and the potentiometer 56 to provide correction for variations in temperature. Like the resistor 66, the potentiometer 70 is arranged to be adjusted by, or constitutes a part of, a temperature sensing device.

It will be seen that the system of FIG. 8, as described thus far, consists principally of elements that are the same as, or substantially equivalent to, corresponding elements in the system of FIG. 6. As long as the time-to-go as represented by the position of the shaft 32 is greater than six seconds, the switch 54 remains open and the relay magnet 57 is de-energized, so that the contacts of the relay 58 are in the position shown in the drawing. The resulting connections place the computer system in its first mode of operation, which is substantially identical to the previously described operation of the system of FIG. 6.

The amplifier 61 and the potentiometer 55 perform the function of the divider 33 of FIG. 6 as follows: The potentiometer 55 forms part of a negative feedback link from the output to the input of the amplifier 61. The amplifier itself is designed to have a relatively high gain, designated here as $\mu$. The overall gain of the amplifier, including the effect of the feedback network, is $$\frac{\mu}{1-\mu\beta}$$

where $\beta$ is the fraction of the amplifier output that is superimposed on the input. Thus, considering the voltage F as the input, and T as the fraction $\beta$ (as determined by the position of the shaft 32), the output of the amplifier will be:

$$F \cdot \frac{\mu}{1-\mu T}$$

Now if $\mu$ is large enough so that $\mu T$ is much greater than unity under the conditions of operation, the above expression will be very nearly the same as:

$$F \cdot \frac{\mu}{-\mu T}$$

or $-F/T$. The negative sign is not significant here, since it can be eliminated by proper choice of the polarity of the reference source 34.

When the time-to-go has decreased to six seconds, the switch 54 closes to actuate the relay 58 and change the connections of the computer for the second mode of operation. However, the relay 59 and the azimuth switch 60 act as interlocks to prevent this change if either the range rate or the bearing angle is less than the respective predetermined value. In either of these events, the computer remains in the first mode of operation throughout the entire attack. The reason for this is that a low range rate implies that the attacker has been maneuvered into a tail chase against the target, in which case azimuth steering errors cannot be corrected by variation of the firing time, and it is preferable to retain the azimuth steering signals; if the bearing angle is small, either a tail chase or a headon attack is implied, and the same consideration applies.

If the relay 59 and switch 60 are closed, the relay 58 operates when the switch 54 closes, and the input circuits of the amplifier 61 are transferred. The amplifier 61 now has a negative feedback path through the sine channel of the azimuth resolver 16. The input signal from the multiplier 26 is $R\omega_D$. The resulting output from the amplifier 61 is $R\omega_D/\sin\theta$, which (from Equation 13 is $f/t$. The cosine output of the azimuth resolver 16 is $$\frac{f \cos\theta}{t}$$

and this makes the cosine output of the elevation resolver become $$\frac{f \cos\theta \cos E}{t}$$

Denoting the position of the time shaft as $t_c$, the multiplier potentiometer 52 in the time servo provides a signal of magnitude $$\frac{t_c f \cos\theta \cos E}{t}$$

and the potentiometer 51 provides a signal of magnitude $Rt_c$. These signals are combined with the range signal R in the amplifier 49 as already described, to energize the motor 50 and drive the shaft 32 so as to reduce their algebraic sum to zero:

$$R + Rt_c - \frac{t_c f \cos\theta \cos E}{t} = 0$$

When this occurs, $t_c$ becomes equal equal to $t$, because the actual position of the shaft 32 is the same as that required to satisfy the equation, and the shaft position represents the time-to-go, $t$.

The potentiometer 55 acts as a multiplier, multiplying the output $f/t$ of the amplifier 61 by $t$ to provide a signal representing $f$. This signal goes to the voltage comparator 36 for comparison with the output $f(t)$ of the ballistic function generator 35.

The sine output of the elevation resolver 15 is $$\frac{f \cos\theta \sin E}{t}$$

The voltage at the junction of resistors 65 and 66 corresponds to $$\frac{Gf}{t}$$

and that at the tap of the potentiometer 67 represents $$\frac{Jf}{t}$$

The sum of these signals is proportional to the elevation steering signal $\Delta_{EL\,II}$ of Equation 14. The lift acceleration signal $a_L/V$ from the accelerometer 68 is a "quick indication" term to compensate for the delay introduced by a steering signal filter system 71, as will be described.

The output of the amplifier 64 is the unfiltered elevation steering signal, in both modes of operation of the system. The output of the amplifier 63 is the unfiltered azimuth steering signal during the first mode of operation; during the second mode, the inputs to the amplifier 63 are disconnected and there is no azimuth steering signal.

In the operation of a tracking radar system such as that of FIG. 5, the direction of antenna sometimes tends to vary at random, about a position corresponding to the line of sight to the center of the target. This is caused by "scintillation," wherein the strongest reflection may come from one part of the target and then from another part, as the attitude of the target changes. The change in the apparent bearing and elevation angles due to this effect is not large, but the momentary rate of change may be much greater than the true deflection and elevation rates. The rate gyros respond to these random variations, and their output signals may include large spurious components superimposed on the desired signals $\omega_D$ and $\omega_E$. These undesired components are referred to as "tracking noise."

Tracking noise presents a serious problem in radar fire control systems, because the computer must act on the basis of the signals that are supplied to it, and when such signals include substantial noise, the outputs of the computer will be erratic. An obvious expedient would be to filter the rate signals so as to remove a substantial part of the random variations, before applying them to the computer. However, filtering would introduce time delays in the desired signals; the more effective the filtering, the greater the delay would be. The computer outputs would be in error whenever there was any change in the rate signals, because the rate information would always be late by the amount of the filter delays. As a practical matter, no particularly useful compromise can be made between delay errors and tracking noise errors by filtering the angular rate signals.

In the system of FIG. 8, the steering signals appearing at the output terminals of the amplifiers 63 and 64 will include the full effects of tracking noise on the angular rate input signals to the computer. When the tracking noise is large, these unfiltered steering signals will fluctuate to such an extent as to seriously impair their usefulness. Simple low-pass filtering of these signals would not be quite as disadvantageous as filtering the input rate signals, because changes in the true steering signals (i.e. the desired components of the unfiltered steering signals) are not likely to be as rapid as those in the rate signals. However, such simple filtering would delay the steering signals to an undesirable extent.

For example, suppose the desired steering signal calls for the attacker to climb; the signal would be delayed by the filter, and would reach the pilot or control system some time after the beginning of the need to climb. Then, as the attacker climbs in response to the delayed signal, it finally reaches a position where further climb is not required. But the steering signal is delayed, and the attacker continues to climb. When the delayed steering signal indicates that the attacker should level off, it has already reached a position from which it must descend. Thus the filter delays will cause the attacker to follow a course that oscillates or hunts about the desired course.

Another undesirable result of simple filtering of the steering signals arises when the attacker is in a banked attitude, as it must be when executing a turn. Under this condition, left-right steering will raise or lower the nose of the attacker, and up-down steering will change the heading azimuth, by an amount and in a sense that depends on the bank angle. Thus the azimuth steering signal will be affected to some extent by any control of the elevation steering in response to an elevation error signal, and the elevation steering signal will be affected by azimuth steering. When both signals are delayed by filtering, this "cross-talk" between the two can become troublesome.

The steering signal filter system 71 includes a resolver 72, filters 73 and 74, and a second resolver 75. The resolver 72 has two input terminals 76 and 77, which are connected to the amplifiers 63 and 64 respectively, and it contains orthogonally disposed coupling means arranged in known manner to couple each of the inputs to two output terminals 78 and 79, the coefficients of coupling being sine and cosine functions of the position of the shaft 80. Thus, assuming the shaft 80 to be at an angle $\lambda$ with respect to its zero or reference position, the voltage at the terminal 78 is $$E_A \cos \lambda + E_E \sin \lambda$$

where $E_A$ and $E_E$ are the voltages applied to the input terminals 76 and 77 respectively. Similarly, the voltage at the terminal 79 is $$E_E \cos \lambda + E_A \sin \lambda$$

The output terminal 78 of the resolver 72 is connected through the filter 73 to an input terminal 81 of the resolver 75. The resolver 75 is like the resolver 72; its input shaft 82 is ganged with the shaft 80 of the resolver 72 and both are mechanically coupled to a vertical gyro unit 83, which maintains the shafts 80 and 82 at an angle $\lambda$ that is equal to the bank angle of the attacker craft.

The output terminal 79 of the resolver 72 is connected to an adding network 84. A reference voltage source 85 is also connected to the network 84. The source 85 is designed to produce a signal of constant magnitude representing the quantity $g/V$, where $g$ is the acceleration of gravity and V is the nominal airspeed of the attacker craft. The output of the adding network 84 goes through the filter 74 to the second input terminal 86 of the resolver 75. The output terminals 87 and 88 of the resolver 75 are adapted to be connected to the azimuth and elevation steering signal input circuits respectively of an indicator system or automatic-pilot, not shown.

The operation of the steering signal filter system is as follows:

The steering signal components of the outputs of amplifiers 63 and 64, $\Delta_{AZ}$ and $\Delta_{EL}$, respectively, are in aircraft coordinates; that is, they are representative of the required angles to turn through about the respective axes of the attacker craft. As long as the attacker is in level flight, these signals are independent of each other; turning the craft about one axis would not affect its position about the other axis. However, when the attacker craft is banked, any turn about either axis will change the attitude in space of the craft so as to change the required angle to turn through about the other axis. The resolver 72 converts the $\Delta_{AZ}$ and $\Delta_{EL}$ signals to new signals $\Delta_H$ and $\Delta_V$ representing the same information, but in coordinates that are independent of the bank angle $\lambda$:

$$\Delta_H = \Delta_{AZ} \cos \lambda + \Delta_{EL} \sin \lambda$$
$$\Delta_V = \Delta_{EL} \cos \lambda + \Delta_{AZ} \sin \lambda$$

There is tracking noise superimposed on the signals $\Delta_H$ and $\Delta_V$, corresponding to that superimposed on the unfiltered steering signals $\Delta_{AZ}$ and $\Delta_{EL}$. The filters 73 and 74 remove some of this noise, at the same time introducing a delay $\tau$ which depends on the filter design, and upon how much of the noise is to be rejected.

The resolver 75 converts the filtered $\Delta_H$ and $\Delta_V$ signals back into aircraft coordinates, providing $\Delta_{AZ}$ and $\Delta_{EL}$ signals from which part of the tracking noise has been removed. These filtered signals are delayed by the time $\tau$, but because the filtering is done in roll-stabilized coordinates, the delay does not result in confusing interaction between them.

As has been discussed above, delays in the steering signals can cause instability because the pilot would tend to over-correct any steering error before receiving the information that it had been corrected. This is minimized or prevented in the present system by the addition of so-called "quick indication" signal terms derived from the lift accelerometer 68 and the gravitational acceleration reference source 85.

The signal from the accelerometer 68, representing $$\frac{a_L}{V}$$

appears as one of the components in the output of the amplifier 64. The resolver 72 separates this into two further components which appear at the terminals 78 and 79 respectively of the resolver 72. The lift acceleration signal component at the terminal 78 is proportional to:

$$\frac{a_L \sin \lambda}{V}$$

If the pitch angle is small, the above quantity is substantially equal to the horizontal rate of turn of the attacker craft. Therefore, it is the same as the rate of change of the horizontal steering signal, $\dot{\Delta}_H$, caused by change of course of the attacker. The lift accelerometer 68 is designed or adjusted to have a scale factor such that the magnitude of the rate signal component at the terminal 78 represents: $\tau \dot{\Delta}_H$, where $\tau$ is the time constant of the filter 73. This quantity is then equivalent to the angle that the attacker would turn through during the time $\tau$, if it turned continuously at the rate of $\dot{\Delta}_H$. If the craft is turning so as to reduce the error signal $\Delta_H$, the rate signal $\dot{\Delta}_H$ is negative with respect to the error signal, and the net useful input to the filter 73 is the difference between $\Delta_H$ and $\tau \dot{\Delta}_H$.

It will be seen that if the computer calls for the craft to turn through an angle $\Delta_H$, and the craft is turning at a rate $\dot{\Delta}_H$ such as to make $\Delta_H$ reach zero at the end of a time $\tau$, the net input to the filter 73 will be zero; in other words, the net steering signal reaches zero at a time $\tau$, before the error reaches zero. The filter relays the net steering signal by the time $\tau$, so the signal at the output of the filter 73 reaches zero substantially at the same time the undelayed error signal $\Delta_H$ at the input to the filter becomes zero. Thus, the added turning rate signal compensates for the filter delay, insofar as the effect of the craft's own motion on the steering signal is concerned.

In the vertical steering channel, the lift acceleration signal reaches the terminal 79 of the resolver 72 as a component of magnitude $$\frac{a_L \cos \lambda}{V}$$

This is combined in the adding network 84 with the output by the reference voltage source 85, which is made to correspond to:

$$\frac{g}{V}$$

The polarity of the source 85 is selected to make the above signal negative with respect to the lift acceleration signal when the lift is upward. The quick indication term in the output of the adding network 84 then corresponds to the absolute vertical acceleration of the craft multiplied by $\tau$ and divided by the airspeed V. This is equivalent to the vertical rate of turn, $\dot{A}_V$, i.e., the rate of turn of the aircraft about a horizontal axis perpendicular to the longitudinal axis of the craft, times the time $\tau$. This quantity, $\tau\dot{A}_V$, compensates for the delay $\tau$ in the filter 74 in the same manner as the corresponding horizontal rate signal $\tau\dot{A}_H$ compensates for the delay in the filter 73.

The smoothed $A_H$ and $A_V$ steering signals thus produced are impressed on terminals 81 and 86, respectively, of roll resolver 75 where they are converted back to the $A_{AZ}$ and $A_{EL}$ steering signals, i.e. signals for steering the attacking craft in azimuth and elevation. These signals, which appear at terminals 87 and 88, respectively, of roll resolver 75, are smoothed or filtered to the extent that they can be utilized by the steering indicator and/or auto-pilot 3, as illustrated in FIG. 5, to direct the craft along the computed attack course and, at the same time, provide a sufficient quick indication of a correction in the attack course to substantially prevent an "over-correction."

In describing the present invention, it is assumed that the teachings of this specification cover any changes or modifications of the disclosed embodiment which do not constitute a departure from the spirit and scope of the invention. In this respect, it is specifically pointed out that although the disclosed embodiment has been described with regard to its functioning in conjunction with rocket armament, it is presumed to be within the scope of the teachings of this specification that the disclosed invention may also be used in the same manner for launching guided missiles or other similar type armament.

What is claimed is:

1. A computer system for translating into signals for steering a mobile attacker craft a plurality of input signals that represent respectively the range of a selected target from the attacker craft, and the azimuth, elevation, deflection rate, and elevation rate of the line of sight between the attacker craft and the target, including: means for providing a reference signal that represents the length of a predetermined projectile trajectory relative to the attacker craft, means responsive to said reference signal and to said range, azimuth, and elevation signals to produce a signal representing the quotient of said length divided by a predicted value of time-to-go before impact, and a signal representing the quotient of the gravity and thrust drop component of said trajectory divided by said predicted time; means responsive to said first quotient signal and to said azimuth and elevation signals to produce first and second product signals representing respectively the product of said first quotient and the sine of said azimuth, and the product of said first quotient, the cosine of said azimuth, and the sine of said elevation; means responsive to said range signal and to said elevation and deflection rate signals to produce third and fourth product signals representing respectively the product of the range and elevation rate, and the product of the range and deflection rate; means for adding said second quotient signal and said first and third product signals algebraically to form a resultant signal that represents the deviation in elevation between the actual course of the attacker craft and a lead collision course to the target, and means for adding said second and fourth product signals algebraically to form a resultant signal that represents a deviation in azimuth between said actual course and said lead collision course.

2. A fire control computer adapted to be carried on a mobile attacker craft for translating into signals for steering said craft a plurality of input signals that represent respectively the range R of a selected target from the attacker craft and the azimuth $\theta$, elevation E, deflection rate $\omega_D$, and elevation rate $\omega_E$ of the line of sight from the attacker craft to the selected target, comprising: a reference signal source for providing a signal that represents the length F of a predetermined projectile trajectory relative to the attacker craft, a servo-mechanism having an output shaft and responsive to said reference signal and to said range, azimuth and elevation signals to maintain said shaft at a position representing a predicted value T of time-to-go before impact, a divider device connected to said reference source and coupled to said shaft and controlled thereby to produce a signal representing the quotient $$\frac{F}{T}$$

means connected to said divider device for producing a signal representing the quotient $$\frac{G}{T}$$

of the gravity and thrust drop component G of said trajectory divided by said predicted time, resolver means connected to said divider means and responsive to said $$\frac{F}{T}$$

signal and to said azimuth and elevation signals to produce signals representing $$\frac{F}{T}\sin\theta$$

and $$\frac{F}{T}\cos\theta\sin E$$

respectively; multiplier means responsive to said range signal and to said elevation and deflection rate signals to produce signals representing respectively the product $R\omega_E$ of the range and the elevation rate, and the product $R\omega_D$ of the range and the deflection rate; first signal adding means and means for applying said $$\frac{G}{T}, \frac{F}{T}\cos\theta\cos E$$

and $R\omega_E$ signals thereto to form a resultant signal that represents the deviation in elevation between the actual course of the attacker craft and a lead collision course to the target, and second signal adding means for applying said $$\frac{F}{T}\sin\theta$$

and $R\omega_D$ signals thereto to form a resultant signal that represents the deviation in azimuth between said actual course and said lead collision course.

3. A computer system for translating into signals for steering a mobile attacker craft a plurality of input signals that represent respectively the range of a selected target from the attacker craft, and the azimuth, elevation, deflection rate, and elevation rate of the line of sight between the attacker craft and the target, including: means for providing a reference signal that represents the length of a predetermined projectile trajectory relative to the attacker craft, means responsive to said reference signal and to said range, azimuth, and elevation signals to produce a signal representing the quotient of said length divided by a predicted value of time-to-go before impact, and a signal representing the quotient of the gravity and thrust drop component of said trajectory divided by said predicted time; means responsive to said first quotient signal and to said azimuth and elevation signals to produce first and second product signals representing respectively the product of said first quotient and the sine of said azimuth, and the product of said first quotient, the cosines of said azimuth, and the sine of said elevation; means responsive to said range signal and to said elevation and deflection rate signals to produce third and fourth product signals representing respectively the product of the range and elevation rate, and the product of the range and the deflection rate; means for adding said second quotient signal and said first and third product signals algebraically to form a resultant signal that represents the deviation in elevation between the actual course of the attacker craft and a lead collision course to the target, and means for adding said second and fourth product signals algebraically to form a resultant signal that represents the deviation in azimuth between said actual course and said lead collision course.

4. A fire control computer for translating into signals for steering a mobile attacker craft a plurality of input signals that represent respectively the range R of a selected target from the attacker craft and the azimuth $\theta$, elevation E, deflection rate $\omega_D$, and elevation rate $\omega_E$ of the line of sight from the attacker craft to the selected target, comprising a reference signal source for providing a signal that represents the length F of a predetermined projectile trajectory relative to the attacker craft, means responsive to said reference signal and to said range, azimuth and elevation signals to produce a signal representing the quotient $$\frac{F}{T}$$

of said length divided by a predicted value T of time-to-go before impact, and a signal representing the quotient $$\frac{G}{T}$$

of the gravity and thrust drop component of said trajectory divided by said predicted time; means responsive to said $$\frac{F}{T}$$

signal and to said azimuth and elevation signals to produce signals representing $$\frac{F}{T} \sin \theta$$

and $$\frac{F}{T} \cos \theta \sin E$$

respectively; means responsive to said range signal and to said elevation and deflection rate signals to produce signals representing respectively the product $R\omega_E$ of the range and the elevation rate, and the product $R\omega_D$ of the range and deflection rate; means for adding said signals representing $G/T$, $$\frac{F}{T} \cos \theta \sin E$$

and $R\omega_E$ algebraically to form a resultant signal that represents the deviation in elevation between the actual course of the attacker craft and a lead collision course to the target, and means for adding said $$\frac{F}{T} \sin \theta$$

and $R\omega_D$ signals algebraically to form a resultant signal that represents the deviation in azimuth between said actual course and said lead collision course.

5. A fire control computer adapted to be carried on a mobile attacker craft for producing signals for steering said craft from a plurality of input signals that represent respectively the range R of a selected target from the attacker craft and the azimuth $\theta$, elevation E, deflection rate $\omega_D$, and elevation rate $\omega_E$ of the line of sight from the attacker craft to the selected target, comprising: a reference signal source for providing a signal that represents the length F of a predetermined projectile trajectory relative to the attacker craft, a servo-mechanism having an output shaft and responsive to said reference signal and to said range, azimuth and elevation signals to maintain said shaft at a position representing a predicted value T of time-to-go before impact, a divided device connected to said reference source and coupled to said shaft and controlled thereby to produce a signal representing the quotient $$\frac{F}{T}$$

means connected to said divider device for producing a signal representing the quotient $$\frac{G}{T}$$

of the gravity and thrust drop component G of said trajectory divided by said predicted time, resolver means connected to said divider means and responsive to said $$\frac{F}{T}$$

signal and to said azimuth and elevation signals to produce signals representing $$\frac{F}{T} \sin \theta$$

and $$\frac{F}{T} \cos \theta \sin E$$

respectively; multiplier means responsive to said range signal and to said elevation and deflection rate signals to produce signals representing respectively the product $R\omega_E$ of the range and the elevation rate, and the product $R\omega_D$ of the range and the deflection rate; first signal adding means and means for applying said $$\frac{G}{T}, \frac{F}{T} \cos \theta \cos E$$

and $R\omega_E$ signals thereto to form a resultant signal that represents the deviation in elevation between the actual course of the attacker craft and a lead collision course to the target, and second signal adding means and means for applying said $$\frac{F}{T} \sin \theta$$

and $R\omega_D$ signals thereto to form a resultant signal that represents the deviation in azimuth between said actual course and said lead collision course.

6. A fire control computer for translating into signals for steering a mobile attacker craft a plurality of input signals that represent respectively the range R of a selected target from the attacker craft and the azimuth $\theta$, elevation E, deflection rate $\omega_D$, and elevation rate $\omega_E$ of the line of sight from the attacker craft to the selected target, comprising a reference signal source for providing a signal that represents the length F of a predetermined projectile trajectory relative to the attacker craft, means responsive to said reference signal and to said range, azimuth and elevation of signals to produce a signal representing the quotient $$\frac{F}{T}$$

of said length divided by a predicted value T of time-to-go before impact, and a signal representing the quotient $$\frac{G}{T}$$

of the gravity and thrust drop component of said trajectory divided by said predicted time; means responsive to said $$\frac{F}{T}$$

signal and to said azimuth and elevation signals to produce signals representing $$\frac{F}{T}\sin\theta$$

and $$\frac{F}{T}\cos\theta\sin E$$

respectively; means responsive to said range signal and to said elevation and deflection rate signals to produce signals representing respectively the product $R\omega_E$ of the range and the elevation rate, and the product $R\omega_D$ of the range and the deflection rate; means for adding said signals representing $G/T$, $$\frac{F}{T}\cos\theta\sin E$$

and $R\omega_E$ algebraically to form a resultant signal that represents the deviation in elevation between the actual course of the attacker craft and a lead collision course to the target, and means for adding said $$\frac{F}{T}\sin\theta$$

and $R\omega_D$ signals algebraically to form a resultant signal that represents the deviation in azimuth between said actual course and said lead collision course.

7. A fire control computer for translating into firing signals a plurality of inputs that represent respectively the range of a selected target from a mobile attacker craft, and the azimuth, elevation, deflection rate, and elevation rate of the line of sight from the attacker craft to the target, including a reference signal source for producing a signal that represents the length of a predetermined projectile trajectory relative to the attacker craft, an adjustable divided device connected to said reference signal source to produce an output that represents the quotient of said length divided by a divisor having a magnitude dependent upon the adjustment of said divider, a trigonometric resolver connected to said divider and responsive to said quotient output and to said azimuth input to produce an output signal representing the product of said quotient and the cosine of said azimuth; a second resolver connected to said first resolver and responsive to the cosine output thereof and to said elevation input to produce an output signal representing the product of said cosine output and the cosine of said elevation; a differentiator device responsive to said range input to produce a range rate signal; control means connected to said differentiator and to said second resolver, and responsive to said range input, said range rate signal, and the cosine output of said second resolver to adjust the magnitude of the divisor introduced by said divider device, thereby adjusting the magnitude of said cosine output of said second resolver to an equilibrium value having a predetermined relationship to said range input and said range rate signal such that the magnitude of said divisor represents a predicted value of time-to-go before impact of a projectile on the target; a ballistic function generator coupled to said control means for producing a signal representing the relative length of the trajectory of a projectile having predetermined ballistic characteristics, corresponding to a time of flight equal to said predicted time-to-go; and a signal comparator device connected to said ballistic function generator and to said reference signal source and responsive to the relationship between the magnitude of said reference signal and said ballistic signal to produce a firing signal and adjusted to produce, in response to the quotient output of said divider a signal representing the gravity and thrust drop angle of said projectile trajectory; a first signal adding network connected to said third multiplier, said second resolver, and said first multiplier, and responsive to the algebraic sum of said gravity and thrust drop signal, the sine output of said second resolver, and said range-elevation rate product signal to produce an elevation steering signal proportional to said sum and representative of the deviation of said attacker craft in elevation from a lead collision course to said target; and a second signal adding network connected to said first resolver and to said second multiplier, and responsive to the algebraic sum of the sine output of said first resolver and said range-deflection rate product signal to produce an azimuth steering signal proportional to said sum and representative of the deviation of said attacker craft in azimuth from said lead collision course.

8. A fire control computer for translating into steering and firing signals, a plurality of input signals that represent respectively the range R of a selected target from a mobile attacker craft and the azimuth $\theta$, elevation E, deflection rate $\omega_D$, and elevation rate $\omega_E$ of the line of sight from the attacker craft to the selected target, comprising a reference signal source for providing a signal that represents the length F of a predetermined projectile trajectory relative to the attacker craft, a servo-mechanism having an output shaft and responsive to said reference signal and to said range, azimuth and elevation signals to maintain said shaft at a position representing a predicted value T of time-to-go before impact, a divider device connected to said reference source and coupled to said shaft and controlled thereby to produce a signal representing the quotient $$\frac{F}{T}$$

means connected to said divider device for producing a signal representing the quotient $$\frac{G}{T}$$

of the gravity and thrust drop component G of said trajectory divided by said predicted time, and means coupled to said shaft and controlled thereby to produce a signal representing a ballistic function $f(T)$ that corresponds to the relative distance that a projectile of the type to be used would travel during a time of flight equal to T; means for comparing the magnitude of said last mentioned signal with said reference signal to produce a firing signal when $f(T)$ becomes equal to F; resolver means connected to said divider means and responsive to said $$\frac{F}{T}$$

signal and to said azimuth and elevation signals to produce signals representing $$\frac{F}{T}\sin\theta$$

and $$\frac{F}{T}\cos\theta\sin E$$

respectively; multiplier means responsive to said range signal and to said elevation and deflection rate signals to produce signals representing respectively the produce $R\omega_E$ of the range and the elevation rate, and the product $R\omega_D$ of the range and the deflection rate; first signal adding means and means for applying said $$\frac{G}{T}, \frac{F}{T}\cos\theta\cos E$$

and $R\omega_E$ signals thereto to form a resultant signal that represents the deviation in elevation between the actual course of the attacker craft and a lead collision course to the target, and second signal adding means and means for applying said $$\frac{F}{T} \sin \theta$$

and $R\omega_D$ signals to said second signal adding means to form a resultant signal that represents the deviation in azimuth between said actual course and said lead collision course.

9. A fire control computer for translating into steering and firing signals a plurality of inputs that represent respectively the range of a selected target from a mobile attacker craft, and the azimuth, elevation, deflection rate, and elevation rate of the line of sight from the attacker craft to the target, including a reference signal source for producing a signal that represents the length of a predetermined projectile trajectory relative to the attacker craft, and adjustable divider device connected to said reference signal source to produce an output that represents the quotient of said length divided by a divisor having a magnitude dependent upon the adjustment of said divider, a trigonometric resolver connected to said divider and responsive to said quotient output and to said azimuth input to produce output signals representing the products of said quotient and the sine and cosine respectively of said azimuth; a second resolver connected to said first resolver and responsive to the cosine output thereof and to said elevation input to produce output signals representing the products of said cosine output and the sine and cosine respectively of said elevation; a differentiator device responsive to said range input to produce a range rate signal; control means connected to said differentiator and to said second resolver, and responsive to said range input, said range rate signal, and the cosine output of said second resolver to adjust the magnitude of the divisor introduced by said divider device, thereby adjusting the magnitude of said cosine output of said second resolver to an equilibrium value having a predetermined relationship to said range input and said range rate signal such that the magnitude of said divisor represents a predicted value of time-to-go before impact of a projectile on the target; a ballistic function generator coupled to said control means for producing a signal representing the relative length of the trajectory of a projectile having predetermined ballistic characteristics, corresponding to a time of flight equal to said predicted time-to-go; a signal comparator device connected to said ballistic function generator and to said reference signal source and responsive to said reference signal and said ballistic signal to produce a firing signal; first and second multiplier devices responsive to said range input and to said elevation and deflection rate inputs respectively to produce signals representing the product of said range and elevation rate, and the product of said range and deflection rate; a third multiplier device connected to said divider and adjusted to produce, in response to the quotient output of said divider, a signal representing the gravity and thrust drop angle of said projectile trajectory; a first signal adding network connected to said third multiplier, said second resolver, and said first multiplier, and responsive to the algebraic sum of said gravity and thrust drop signal, the sine output of said second resolver, and said range-elevation rate product signal to produce an elevaton steering signal proportional to said sum and representative of the deviation of said attacker craft in elevation from a lead collision course to said target; and a second signal adding network connected to said first resolver and to said second multiplier, and responsive to the algebraic sum of the sine output of said first resolver and said range-deflection rate product signal to produce an azimuth steering signal proportional to said sum and representative of the deviation of said attacker craft in azimuth from said lead collision course.

10. A fire control system including a tracking radar adapted to be carried on a mobile attacker craft and including a directive antenna, means for substantially continuously positioning said antenna to bear on a selected target, and means for producing a substantially continuous signal representing the range of the target from the attacker craft; means coupled to said antenna for producing further signals representing respectively the rates of change of angular position of said antenna in elevation and in deflection; a computer including multiplier means connected to said radar and responsive to said range and angular rate signal to produce signals representative of the product of the range and the elevation rate, and the product of the range and deflection rate, respectively; said computer also including a reference signal source for producing a signal that represents the length of a predetermined projectile trajectory relative to the attacker craft, a divider device connected to said reference signal source, and a trigonometric resolver connected to said divider, said resolver being coupled to said antenna and responsive to the azimuth angle of position of said antenna to provide outputs proportional respectively to the sine and to the cosine of said azimuth angle; a second resolver, means for applying the cosine output of said first resolver to said second resolver, said second resolver being coupled to said antenna and responsive to the elevation angle of position thereof to provide outputs proportional respectively to the sine and to the cosine of said elevation angle; a servo-mechanism having an output shaft coupled to said divider, said servomechanism being connected to said second resolver and to said radar and responsive to said range signal and to the cosine output of said second resolver to position said shaft to adjust the magnitude of the divisor introduced by said divider; a ballistic function generator also coupled to said shaft to produce a signal representing the relative length of the trajectory of a preselected type of projectile corresponding to a time of flight as represented by the position of said shaft; a signal comparator device connected to said ballistic function generator and to said reference signal source and responsive to equality between said reference signal and said ballistic signal to produce a firing signal; a first signal adding network connected to said divider, said second resolver, and said first mentioned multiplier means, and responsive to the output of said divider, the cosine output of said second resolver, and the range-elevation rate output of said multiplier to provide an elevation steering signal proportional to the sum of said outputs; a second signal adding network connected to said first resolver and to said multiplier means, and responsive to the sine output of said first resolver and the range-deflection rate output of said multiplier to provide an azimuth steering signal proportional to the sum of said last mentioned outputs; and utilization means coupled to said adding networks and responsive to said steering signals for guiding the attacker craft.

11. A fire control system including a tracking radar adapted to be carried on a mobile attacker craft for producing substantially continuous signals representing respectively the range, azimuth, elevation, elevation rate, and deflection rate of a target; multiplier means connected to said radar and responsive to said range and angular rate signals to produce signals representative of the product of the range and the elevation rate, and the product of the range and deflection rate, respectively; a reference signal source for producing a signal that represents a predetermined length of projectile trajectory relative to the attacker craft, a divider device connected to said reference signal source, and a trigonometric resolver connected to said divider, said resolver being coupled to said radar and responsive to the azimuth angle of the selected target to provide outputs proportively to the sine and to the cosine of said azimuth angle; a second resolver means for applying the cosine output of said first resolver to said second resolver, said second resolver being coupled to said radar and responsive to the elevation angle of said target to provide outputs proportional respectively to the sine and to the cosine of said elevation angle; means connected to said second resolver and to said radar and responsive to said range signal and to the cosine output of said second resolver to adjust the magnitude of the divisor introduced by said divider; a first signal adding network connected to said divider, said second resolver, and said first mentioned multiplier means, and responsive to the output of said divider, the cosine output of said second resolver, and the range-elevation rate output of said multiplier to provide an elevation steering signal proportional to the sum of said outputs; a second signal adding network connected to said first resolver and to said multiplier means, and responsive to the sine output of said first resolver and the range-deflection rate output of said multiplier to provide an azimuth steering signal proportional to the sum of said last mentioned outputs; and utilization means coupled to said adding networks and responsive to said steering signals for guiding the attacker craft.

12. A fire control system including a tracking radar adapted to be carried on a mobile attacker craft for producing substantially continuous signals representing respectively the range, azimuth, elevation, elevation rate, and deflection rate of a target; multiplier means connected to said radar and responsive to said range and angular rate signals to produce signals representative of the product of the range and the elevation rate, and the product of the range and deflection rate, respectively; a reference signal source for producing a signal that represents a predetermined length of projectile trajectory relative to the attacker craft, a divider device conected to said reference signal source, and a trigonometric resolver connected to said divider, said resolver being coupled to said radar and responsive to the azimuth angle of the selected target to provide outputs proportional respectively to the sine and to the cosine of said azimuth angle; a second resolver means for applying the cosine output of said first resolver to said second resolver, said second resolver being coupled to said radar and responsive to the elevation angle of said target to provide outputs proportional respectively to the sine and to the cosine of said elevation angle; means connected to said second resolver and to said radar and responsive to said range signal and to the cosine output of said second resolver to adjust the magnitude of the divisor introduced by said divider; a first signal adding network connected to said divider, said second resolver, and said first mentioned multiplier means, and responsive to the output of said divider, the cosine output of said second resolver, and the range-elevation rate output of said multiplier to provide an elevation steering signal proportional to the sum of said outputs; a second signal adding network connected to said first resolver and to said multiplier means, and responsive to the sine output of said first resolver and the range-deflection rate output of said multiplier to provide an azimuth steering signal proportional to the sum of said last mentioned outputs; and utilization means coupled to said adding networks and responsive to said steering signals for guiding the attacker craft.

13. A fire control computer for translating into signals for steering a mobile attacker craft a plurality of input signals that represent respectively the range R of a selected target from the attacker craft and the azimuth $\theta$, elevation E, deflection rate $\omega_D$, and elevation rate $\omega_E$ of the line of sight from the attacker craft to the selected target, comprising a reference signal source for providing a signal that represents the length F of a predetermined projectile trajectory relative to the attacker craft, means responsive to said reference signal and to said range, azimuth and elevation signals to produce a signal representing the quotient $$\frac{F}{T}$$

of said length divided by a predicted valve T of time-to-go before impact, and a signal representing the quotient $$\frac{G}{T}$$

of the gravity and thrust drop component of said trajectory divided by said predicted time; means responsive to said $$\frac{F}{T}$$

signal and to said azimuth and elevation signals to produce signals representing $$\frac{F}{T} \sin \theta$$

and $$\frac{F}{T} \cos \theta \sin E$$

respectively; means responsive to said range signal and to said elevation and deflection rate signals to produce signals representing respectively the product $R\omega_E$ of the range and the elevation rate, and the product $R\omega_D$ of the range and the deflection rate; means for adding said signals representing $G/T$, $$\frac{F}{T} \cos \theta \sin E$$

and $R\omega_E$ algebraically to form a resultant signal that represents the deviation in elevation between the actual course of the attacker craft and a lead collision course to the target, and means for adding said $$\frac{F}{T} \sin \theta$$

and $R\omega_D$ signals algebraically to form a resultant signal that represents the deviation in azimuth between said actual course and said lead collision course.

14. A computer system for translating into steering signals in response a plurality of inputs that represent respectively the range of a selected target from a mobile attacker craft, and the azimuth, elevation, deflection rate, and elevation rate of the line of sight from the attacker craft to the target, including a reference signal source for producing a signal that represents the length of a predetermined projectile trajectory relative to the attacker craft, an adjustable divider device connected to said reference signal source to produce an output that represents the quotient of said length divided by a divisor having a magnitude dependent upon the adjustment of said divider, a trigonometric resolver connected to said divider and responsive to said quotient output and to said azimuth input to produce output signals representing the products of said quotient and the sine and cosine respectively of said azimuth; a second resolver connected to said first resolver and responsive to the cosine output thereof and to said elevation input to produce output signals representing the products of said cosine output and the sine and cosine respectively of said elevation; a differentiator device responsive to said range input to produce a range rate signal; control means connected to said differentiator and to said second resolver, and responsive to said range input, said range rate signal, and the cosine output of said second resolver to adjust the magnitude of the divisor introduced by said divider device, thereby adjusting the magnitude of said cosine output of said second resolver to an equilibrium value having a predetermined relationship to said range input and said range rate signal such that the magnitude of said divisor represents a predicted value of time-to-go before impact of a projectile on the target; first and second multiplier devices responsive to said range input and to said elevation and deflection rate inputs respectively to produce signals representing the product of said range and elevation rate, and the product of said range and deflection rate; a third multiplier device connected to said divider and adjusted to produce, in response to the quotient output of said divider, a signal representing the gravity and thrust drop angle of said projectile trajectory; a first signal adding network connected to said third multiplier, said second resolver, and said first multiplier, and responsive to the algebraic sum of said gravity and thrust drop signal, the sine output of said second resolver, and said range-elevation rate product signal to produce an elevation steering signal proportional to sum and representative of the deviation of said attacker craft in elevation from a lead collison course to said target; and a second signal adding network connected to said first resolver and to said second multiplier, and responsive to the algebraic sum of the sine output of said first resolver and said range-deflection rate product signal to produce an azimuth steering signal proportional to said sum and representative of the deviation of said attacker craft in azimuth from said lead collision course.

15. A fire control system including a tracking radar adapted to be carried on a mobile attacker craft and including a directive antenna, means for substantially continuously positioning said antenna to bear on a selected target, and means for producing a substantially continuous signal representing the range of the target from the attacker craft; means coupled to said antenna for producing further signals representing respectively the rates of change of angular position of said antenna in elevation and in deflection; a computer including multiplier means connected to said radar and responsive to said range and angular rate signals to produce signals representative of the product of the range and the elevation rate, and the product of the range and deflection rate, respectively; said computer also including a reference signal source for producing a signal that represents the length of a predetermined projectile trajectory relative to the attacker craft, a divider device connected to said reference signal source, and a trigonometric resolver connected to said divider, said resolver being coupled to said antenna and responsive to the azimuth angle of position of said antenna to provide outputs representative respectively of the product of the output of said divider and the sine of said azimuth angle, and of the product of the output of said divider and the cosine of said azimuth angle; a second resolver, means for applying the cosine output of said first resolver to said second resolver, said second resolver being coupled to said antenna and responsive to the elevation angle of position thereof to provide outputs representative respectively of the products of the sine and the cosine of said elevation angle and the cosine output of said first resolver; a servomechanism having an output shaft coupled to said divider, said servomechanism being connected to said second resolver and to said radar and responsive to said range signal and to the cosine output of said second resolver to position said shaft to adjust the magnitude of the divisor introduced by said divider; a ballistic function generator also coupled to said shaft to produce a signal representing the relative length of the trajectory of a preselected type of projectile corresponding to a time of flight as represented by the position of said shaft; a signal comparator device connected to said ballistic function generator and to said reference signal source and responsive to said reference signal and said ballistic signal to produce a firing signal; a multiplier device connected to said divider to produce an output signal representing the gravity and thrust drop of the projectile trajectory; a first signal adding network connected to said last mentioned multiplier, said second resolver, and said first mentioned multiplier means, and responsive to the output of said last mentioned multiplier, the cosine output of said second resolver, and the range-elevation rate output of said first mentioned multiplier to provide an elevation steering signal proportional to the sum of said outputs; and a second signal adding network connected to said first resolver and to said first mentioned multiplier means, and responsive to the sine output of said first resolver and the range-deflection rate output of said first mentioned multiplier to provide an azimuth steering signal proportional to the sum of said last mentioned outputs.

16. A fire control computer adapted to be carried on a mobile attacker craft for deriving signals for steering said craft from a plurality of input signals that represent respectively the range R of a selected target from the attacker craft and the azimuth $\theta$, elevation E, deflection rate $\omega_D$, and elevation rate $\omega_E$ of the line of sight from the attacker craft to the selected target, comprising: a reference signal source for providing a signal that represents the length F of a predetermined projectile trajectory relative to the attacker craft, a servomechanism having an output shaft and responsive to said reference signal and to said range, azimuth and elevation signals to maintain said shaft at a position representing a predicted value T of time-to-go before impact, a divider device connected to said reference source and coupled to said shaft and controlled thereby to produce a signal representing the quotient $$\frac{F}{T}$$

means connected to said divider device for producing a signal representing the quotient $$\frac{G}{T}$$

of the gravity and thrust drop component G of said trajectory divided by said predicted time, resolver means connected to said divider means and responsive to said $$\frac{F}{T}$$

signal and to said azimuth and elevation signals to produce signals representing $$\frac{F}{T} \sin \theta$$

and $$\frac{F}{T} \cos \theta \sin E$$

respectively; multiplier means responsive to said range signal and to said elevation and deflection rate signals to produce signals representing respectively the product $R\omega_E$ of the range and the elevation rate, and the product $R\omega_D$ of the range and the deflection rate; first signal adding means and means for applying said $$\frac{G}{T}, \frac{F}{T} \cos \theta \cos E$$

and $R\omega_E$ signals thereto to form a resultant signal that represents the deviation in elevation between the actual course of the attacker craft and a lead collision course to the target, and second signal adding means and means for applying said $$\frac{F}{T} \sin \theta$$

and $R\omega_D$ signals thereto to form a resultant signal that represents the deviation in azimuth between said actual course and said lead collision course.

17. A fire control computer adapted to be carried on a mobile attacker craft for deriving signals for steering said craft from a plurality of input signals that represent respectively the range R of a selected target from a mobile attacker craft and the azimuth $\theta$, elevation E, deflection rate $\omega_D$, and elevation rate $\omega_E$ of the line of sight from the attacker craft to the selected target, comprising a reference signal source for providing a signal that represents the length F of a predetermined projectile trajectory relative to the attacker craft, a servomechanism having an output shaft and responsive to said reference signal and to said range, azimuth and elevation signals to maintain said shaft at a position representing a predicted value T of time-to-go before impact, a divider device connected to said reference source and coupled to said shaft and controlled thereby to produce a signal representing the quotient $$\frac{F}{T}$$

means connected to said divider device for producing a signal representing the quotient $$\frac{G}{T}$$

of the vertical component of said trajectory divided by said predicted time and means coupled to said shaft and controlled thereby to produce a signal representing a ballistic function $f(T)$ that corresponds to the relative distance that a projectile of the type to be used would travel during a time of flight equal to T; means for comparing the magnitude of said last mentioned signal with said reference signal to produce a firing signal when $f(T)$ becomes equal to F; resolver means connected to said divider means and responsive to said $$\frac{F}{T}$$

signal and to said azimuth and elevation signals to produce signals representing $$\frac{F}{T} \sin \theta$$

and $$\frac{F}{T} \cos \theta \sin E$$

respectively; multiplier means responsive to said range signal and to said elevation and deflection rate signals to produce signals representing respectively the product $R\omega_E$ of the range and the elevation rate, and the product $R\omega_D$ of the range and the deflection rate; first signal adding means and means for applying to form a resultant signal that represents the deviation in elevation between the actual course of the attacker craft and a lead collision course to the target, and second signal adding means and means for applying said $$\frac{F}{T} \sin \theta$$

and $R\omega_D$ signals to said second signal adding means to form a resultant signal that represents the deviation in azimuth between said actual course and said lead collision course.

18. A fire control system including a tracking radar adapted to be carried on a mobile attacker craft and including a directive antenna, means for substantially continuously positioning said antenna to bear on a selected target, and means for producing a substantially continuous signal representing the range of the target from the attacker craft; means coupled to said antenna for producing further signals representing respectively the rates of change of angular position of said antenna in elevation and in deflection; a computer including multiplier means connected to said radar and responsive to said range and angular rate signals to produce signals representative of the product of the range and the elevation rate, and the product of the range and deflection rate, respectively; said computer also including a reference signal source for producing a signal that represents the length of a predetermined projectile trajectory relative to the attacker craft, a divider device connected to said reference signal source, and a trigonometric resolver connected to said divider, said resolver being coupled to said antenna and responsive to the azimuth angle of position of said antenna to provide outputs representative respectively of the product of the output of said divider and the sine of said azimuth angle, and of the product of the output of said divider and the cosine of said azimuth angle; a second resolver, means for applying the cosine output of said first resolver to said second resolver, said second resolver being coupled to said antenna and responsive to the elevation angle of position thereof to provide outputs representative respectively of the products of the sine and the cosine of said elevation angle and the cosine output of said first resolver; a servomechanism having an output shaft coupled to said divider, said servomechanism being connected to said second resolver and to said radar and responsive to said range signal and to the cosine output of said second resolver to position said shaft to adjust the magnitude of the divisor introduced by said divider; a ballistic function generator also coupled to said shaft to produce a signal representing the relative length of the trajectory of a preselected type of projectile corresponding to a time of flight as represented by the position of said shaft; a signal comparator device connected to said ballistic function generator and to said reference signal source and responsive to equality between said reference signal and said ballistic signal to produce a firing signal; a multiplier device connected to said divider to produce an output signal representing the gravity and thrust drop of the projectile trajectory; a first signal adding network connected to said last mentioned multiplier, said second resolver, and said first mentioned multiplier means, and responsive to the output of said last mentioned multiplier, the cosine output of said second resolver, and the range-elevation rate output of said first mentioned multiplier to provide an elevation steering signal proportional to the sum of said outputs; and a second signal adding network connected to said first resolver and to said first mentioned multiplier means, and responsive to the sine output of said first resolver and the range-deflection rate output of said first mentioned multiplier to provide an azimuth steering signal proportional to the sum of said last mentioned outputs.

19. A fire control system including a tracking radar adapted to be carried on a mobile attacker craft and including a directive antenna, means for substantially continuously positioning said antenna to bear on a selected target, and means for producing a substantially continuous signal representing the range of the target from the attacker craft; means coupled to said antenna for producing further signals representing respectively the rates of change of angular position of said antenna in elevation and in deflection; a computer including multiplier means connected to said radar and responsive to said range and angular rate signals to produce signals representative of the product of the range and the elevation rate, and the product of the range and deflection rate, respectively; said computer also including a reference signal source for producing a signal that represents the length of a predetermined projectile trajectory relative to the attacker craft, a divider device connected to said reference signal source, and a trigonometric resolver connected to said divider, said resolver being coupled to said antenna and responsive to the azimuth angle of position of said antenna to provide outputs representative respectively of the product of the output of said divider and the sine of said azimuth angle, and of the product of the output of said divider and the cosine of said azimuth angle; a second resolver, means for applying the cosine output of said first resolver to said second resolver, said second resolver being coupled to said antenna and responsive to the elevation angle of position thereof to provide outputs representative respectively of the products of the sine and the cosine of said elevation angle and the cosine output of said first resolver; a servomechanism having an output shaft coupled to said divider, said servomechanism being connected to said second resolver and to said radar and responsive to said range signal and to the cosine output of said second resolver to position said shaft to adjust the magnitude of the divisor introduced by said divider; a ballistic function generator also coupled to said shaft to produce a signal representing the relative length of the trajectory of a preselected type of projectile corresponding to a time of flight as represented by the position of said shaft; a signal comparator device connected to said ballistic function generator and to said reference signal source and responsive to equality between said reference signal and said ballistic signal to produce a firing signal; a multiplier device connected to said divider to produce an output signal representing the gravity and thrust drop of the projectile trajectory; a first signal adding network connected to said last mentioned multiplier, said second resolver, and said first mentioned multiplier means, and responsive to the output of said last mentioned multiplier, the sine output of said second resolver, and the range-elevation rate output of said first mentioned multiplier to provide an elevation steering signal proportional to the sum of said outputs; and a second signal adding network connected to said first resolver and to said first mentioned multiplier means, and responsive to the sine output of said first resolver and the range-deflection rate output of said first mentioned multiplier to provide an azimuth steering signal proportional to the sum of said last mentioned outputs.

20. A fire control computer for producing steering and firing signals in response to a plurality of inputs that represent respectively the range of a selected target from a mobile attacker craft, and the azimuth, elevation, deflection rate, and elevation rate of the line of sight from the attacker craft to the target, including a reference signal source for producing a signal that represents the length of a predetermined projectile trajectory relative to the attacker craft, an adjustable divider device connected to said reference signal source to produce an output that represents the quotient of said length divided by a divisor having a magnitude dependent upon the adjustment of said divider, a trigonometric resolver connected to said divider and responsive to said quotient output and to said azimuth input to produce output signals representing the products of said quotient and the sine and cosine respectively of said azimuth; a second resolver connected to said first resolver and responsive to the cosine output thereof and to said elevation input to produce output signals representing the products of said cosine output and the sine and cosine respectively of said elevation; a differentiator device responsive to said range input to produce a range rate signal; control means connected to said differentiator and to said second resolver, and responsive to said range input, said range rate signal, and the cosine output of said second resolver to adjust the magnitude of the divisor introduced by said divider device, thereby adjusting the magnitude of said cosine output of said second resolver to an equilibrium value having a predetermined relationship to said range input and said range rate signal such that the magnitude of said divider represents a predicted value of time-to-go before impact of a projectile on the target; a ballistic function generator coupled to said control means for producing a signal representing the relative length of the trajectory of a projectile having predetermined ballistic characteristics, corresponding to a time of flight equal to said predicted time-to-go; a signal comparator device connected to said ballistic function generator and to said reference signal source and responsive to said reference signal and said ballistic signal to produce a firing signal; first and second multiplier devices responsive to said range input and to said elevation and deflection rate inputs respectively to produce signals representing the product of said range and elevation rate, and the product of said range and deflection rate; a third multiplier device connected to said divider and adjusted to produce in response to the quotient output of said divider, a signal representing the gravity and thrust drop angle of said projectile trajectory; a first signal adding network connected to said third multiplier, said second resolver, and said first multiplier, and responsive to the algebraic sum of said gravity and thrust drop signal, the sine output of said second resolver, and said range-elevation rate product signal to produce an elevation steering signal proportional to said sum and representative of the deviation of said attacker craft in elevation from a lead collision course to said target; and a second signal adding network connected to said first resolver and to said second multiplier, and responsive to the algebraic sum of the sine output of said first resolver and said range-deflection rate product signal to produce an azimuth steering signal proportional to said sum and representative of the deviation of said attacker craft in azimuth from said lead collision course.

21. In an electronic fire control system wherein azimuth and elevation steering signals, $\Delta_{AZ}$ and $\Delta_{EL}$, respectively, are produced for directing an attacking craft along a computed course towards a target, a circuit for smoothing the azimuth and elevation steering signals comprising means for converting said azimuth and elevation signals, $\Delta_{AZ}$ and $\Delta_{EL}$, respectively, into horizontal and vertical components $\Delta_H$ and $\Delta_V$; first and second filtering means for smoothing said horizontal and vertical components $\Delta_H$ and $\Delta_V$, respectively, said filtering means having time constants $\tau_1$ and $\tau_2$; means for subtracting a signal representative of $$\frac{g}{V} \text{ from } \Delta_V$$

where $g$ is the acceleration due to gravity and $V$ is representative of the air speed of said craft; means for producing a signal $$\frac{a_L}{V}$$

where $a_L$ is proportional to the lift of acceleration of said craft, said signal having horizontal and vertical components $$\frac{a_{LH}}{V}$$

and $$\frac{a_{LV}}{V}$$

respectively; means for subtracting said signal $$\frac{a_L}{V}$$

from said elevation steering signal, whereby $$\frac{a_{LH}}{V} = \dot{\Delta}_H \tau_1$$

and $$\frac{a_{LV} + g}{V} = \dot{\Delta}_V \tau_2$$

wherein $\dot{\Delta}_H$ and $\dot{\Delta}_V$ are the horizontal and vertical rate of change of said horizontal and vertical components, $\Delta_H$ and $\Delta_V$, respectively.

References Cited in the file of this patent
UNITED STATES PATENTS

| | | |
|---|---|---|
| 2,600,159 | Ergen | June 10, 1952 |
| 2,616,625 | Griess | Nov. 4, 1952 |
| 2,660,793 | Holschuh | Dec. 1, 1953 |
| 2,671,613 | Hansen | Mar. 9, 1954 |